(12) United States Patent
Matskevich et al.

(10) Patent No.: US 10,437,931 B1
(45) Date of Patent: Oct. 8, 2019

(54) INFORMATION EXTRACTION FROM NATURAL LANGUAGE TEXTS

(71) Applicant: ABBYY Production LLC, Moscow (RU)

(72) Inventors: Stepan Evgenyevich Matskevich, Korolev (RU); Ilya Aleksandrovich Bulgakov, Barnaul (RU)

(73) Assignee: ABBYY Production LLC, Moscow (RU)

( * ) Notice: Subject to any disclaimer, the term of this patent is extended or adjusted under 35 U.S.C. 154(b) by 0 days.

(21) Appl. No.: 15/938,307

(22) Filed: Mar. 28, 2018

(30) Foreign Application Priority Data

Mar. 23, 2018 (RU) .................... 2018110386
Mar. 23, 2018 (RU) .................... 2018110387

(51) Int. Cl.
 *G10L 15/19* (2013.01)
 *G06F 17/27* (2006.01)
 *G06F 17/24* (2006.01)

(52) U.S. Cl.
 CPC ........ *G06F 17/2785* (2013.01); *G06F 17/241* (2013.01); *G06F 17/2765* (2013.01)

(58) Field of Classification Search
 CPC ..... G10L 15/22; G10L 15/1815; G10L 15/18; G06F 17/30976; G06F 17/2881
 USPC .................................................. 704/9, 257
 See application file for complete search history.

(56) References Cited

U.S. PATENT DOCUMENTS

| | | | |
|---|---|---|---|
| 8,594,996 B2 | 11/2013 | Liang et al. | |
| 8,725,666 B2 | 5/2014 | Lemmond et al. | |
| 9,110,852 B1 | 8/2015 | Lerman | |
| 9,672,205 B2 | 6/2017 | Miller | |
| 2005/0074113 A1* | 4/2005 | Mathew | G06Q 10/06 379/265.02 |
| 2007/0016399 A1* | 1/2007 | Gao | G06F 17/2818 704/5 |
| 2009/0144609 A1 | 6/2009 | Liang et al. | |

(Continued)

OTHER PUBLICATIONS

Hoffart, Johannes, et al., "Robust Disambiguation of Named Entities in Text", Jul. 27-31, 2011, 11 pages.
(Continued)

*Primary Examiner* — George C Monikang
(74) *Attorney, Agent, or Firm* — Lowenstein Sandler LLP

(57) ABSTRACT

Systems and methods for extracting facts from natural language texts. An example method of information extraction comprises extracting, from a natural language text, a first plurality of information objects; extracting, from the natural language text, a second plurality of information objects; identifying a set of conflicting information objects, such that a first information object of the set of conflicting information objects belongs to the first plurality of information objects and a second information object of the set of conflicting information objects belongs to the second plurality of information objects; and producing a final list of information objects extracted from the natural language text, by applying, to the set of conflicting information objects, a conflict arbitration function which performs at least one of: modifying the first information object, deleting the first information object, or merging two or more information objects of the set of conflicting information objects.

18 Claims, 16 Drawing Sheets

(56) References Cited

U.S. PATENT DOCUMENTS

2015/0142435 A1\* 5/2015 Kumar P.V. ........ G06F 3/04817
704/235
2015/0278195 A1\* 10/2015 Yang ................... G06F 17/2785
704/9

OTHER PUBLICATIONS

Alhelbawy, Ayman and Gaizauskas, Robert, "Collective Named Entity Disambiguation using Graph Ranking and Clique Partitioning Approaches", Aug. 23-29, 2014, 12 pages.

\* cited by examiner

Fig. 6

INFORMATION EXTRACTION FROM NATURAL LANGUAGE TEXTS

REFERENCE TO RELATED APPLICATIONS

The present application claims the benefit of priority under 35 U.S.C. § 119 to Russian Patent Application No. 2018110386 filed Mar. 23, 2018 and Russian Patent Application No. 2018110387 filed Mar. 23, 2018, the disclosure of which is incorporated by reference herein.

TECHNICAL FIELD

The present disclosure is generally related to computer systems, and is more specifically related to systems and methods for natural language processing.

BACKGROUND

Information extraction may involve analyzing a natural language text to recognize and classify information objects in accordance with a pre-defined set of categories (such as names of persons, organizations, locations, expressions of times, quantities, monetary values, percentages, etc.). Information extraction may further identify relationships between the recognized named entities and/or other information objects.

SUMMARY OF THE DISCLOSURE

In accordance with one or more aspects of the present disclosure, an example method of information extraction from natural language texts may comprise: extracting, by a computer system, a first plurality of information objects from a natural language text; extracting, from the natural language text, a second plurality of information objects; identifying a set of conflicting information objects, such that a first information object of the set of conflicting information objects belongs to the first plurality of information objects and a second information object of the set of conflicting information objects belongs to the second plurality of information objects; and producing a final list of information objects extracted from the natural language text, by applying, to the set of conflicting information objects, a conflict arbitration function which performs at least one of: modifying the first information object, deleting the first information object, or merging two or more information objects of the set of conflicting information objects.

In accordance with one or more aspects of the present disclosure, an example system for information extraction from natural language texts may comprise: a memory and a processor, coupled to the memory. The processor may be configured to: extract, from a natural language text, a first plurality of information objects; extract, from the natural language text, a second plurality of information objects; identify a set of conflicting information objects, such that a first information object of the set of conflicting information objects belongs to the first plurality of information objects and a second information object of the set of conflicting information objects belongs to the second plurality of information objects; and produce a final list of information objects extracted from the natural language text, by applying, to the set of conflicting information objects, a conflict arbitration function which performs at least one of: modifying the first information object, deleting the first information object, or merging two or more information objects of the set of conflicting information objects.

In accordance with one or more aspects of the present disclosure, an example computer-readable non-transitory storage medium may comprise executable instructions that, when executed by a computer system, cause the computer system to: extract, from a natural language text, a first plurality of information objects; extract, from the natural language text, a second plurality of information objects; identify a set of conflicting information objects, such that a first information object of the set of conflicting information objects belongs to the first plurality of information objects and a second information object of the set of conflicting information objects belongs to the second plurality of information objects; and produce a final list of information objects extracted from the natural language text, by applying, to the set of conflicting information objects, a conflict arbitration function which performs at least one of: modifying the first information object, deleting the first information object, or merging two or more information objects of the set of conflicting information objects.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 6 schematically illustrates an example of a lexico-morphological structure of a sentence, in accordance with one or more aspects of the present disclosure;

DETAILED DESCRIPTION

Figure 1:
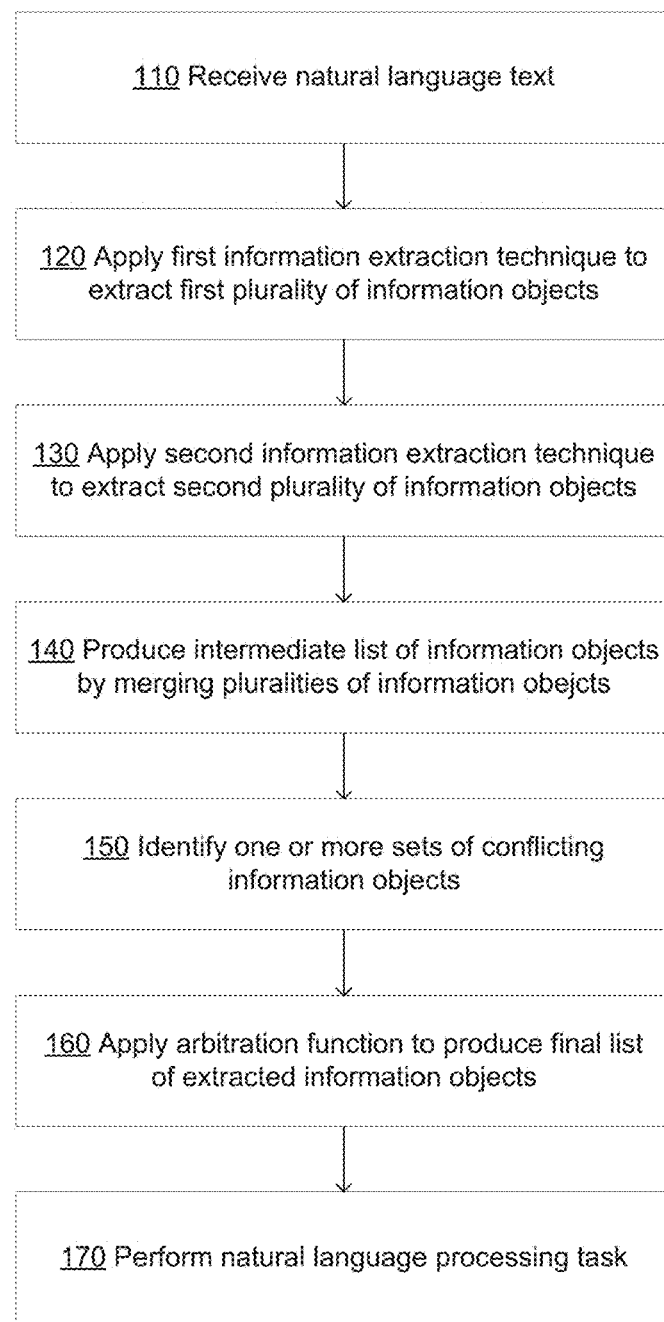
FIG. 1 depicts a flow diagram of one illustrative example of a method for information extraction using multiple extraction techniques, in accordance with one or more aspects of the present disclosure.

Described herein are methods and systems for information extraction from natural language texts. The systems and methods described herein may be employed in a wide variety of natural language processing applications, including machine translation, semantic indexing, semantic search (including multi-lingual semantic search), document classification, electronic discovery, etc.

"Computer system" herein shall refer to a data processing device having a general purpose or specialized processor, a memory, and at least one communication interface. Examples of computer systems that may employ the methods described herein include, without limitation, desktop computers, notebook computers, tablet computers, and smart phones.

"Ontology" herein shall refer to a model representing objects pertaining to a certain branch of knowledge (subject matter area) and relationships among such objects. An ontology may comprise definitions of a plurality of classes, such that each class corresponds to a concept of the subject matter area. Each class definition may comprise definitions of one or more objects associated with the class. Following the generally accepted terminology, an ontology class may also be referred to as concept, and an object belonging to a class may also be referred to as an instance of the concept. In certain implementations, a class may be an ancestor or a descendant of another class. In certain implementations, an object may be associated with two or more classes.

Each class definition may further comprise one or more relationship definitions describing the types of relationships that may be associated with the objects of the class. Relationships define various types of interaction between the associated objects. In certain implementations, various relationships may be organized into an inclusive taxonomy, e.g., "being a father" and "being a mother" relationships may be included into a more generic "being a parent" relationship, which in turn may be included into a more generic "being an ancestor" relationship.

An attribute of an information object may be represented by another information object (e.g., a person's place of birth may be represented by an object of a class "City," while a person's employer may be represented by an object of a class "Company." A class definition may comprise one or more restrictions related to certain attributes of the objects of the class, such as attribute cardinality restrictions (e.g., a person may only have one place of birth) or type restrictions (e.g., a given attribute may be represented by objects of a specified set of classes).

Information extraction may involve analyzing a natural language text to recognize and classify information objects referenced by fragments of the natural language text. Text fragments referencing an information object may be referred as "object annotations." Text fragments referencing an attribute of an information object may be referred as "attribute annotations." An annotation may be specified by its position in the natural language text, including the starting position (word) and the ending position (word).

Information extraction may classify recognized information objects in accordance with a pre-defined set of categories (such as names of persons, organizations, locations, expressions of times, quantities, monetary values, percentages, etc.) Such categories may be represented by concepts of a pre-defined or dynamically built ontology. Information extraction may further identify relationships between the recognized named entities and/or other information objects. Examples of such relationships include employment of a person X by an organizational entity Y, location of an object X in a geo-location Y, acquiring an organizational entity X by an organizational entity Y, etc. Such relationships may be expressed by natural language fragments that may comprise a plurality of words of one or more sentences. Information object relationships may be expressed by information object attributes referencing other information objects (e.g., an information object of a class "Person" may have such attributes as "Place of birth," "Residence," and "Employer," each of which is represented by a reference to an information object of the respective class).

The extracted information, which may be represented by a Resource Definition Framework (RDF) graph, may be utilized for performing various natural language processing operations and tasks, including machine translation, semantic indexing, semantic search, document classification, electronic discovery, etc.

Information extraction may be performed by various extraction methods utilizing configurable rule sets, automatic classification methods (also known as "machine learning classifiers"), heuristic-based approaches, and/or their combinations. The information extraction techniques may rely upon ontologies and/or other document models in order to analyze morphological, lexical, syntactic, sematic, and/or other attributes of the natural language texts.

In an illustrative example, information extraction may involve applying a set of production rules, such that matching a template defined by the left-hand side of a production rule to a semantic structure representing a natural language text fragment may trigger the right-hand side of the production rule, which may assign certain values of to one or more information object attributes. In another illustrative example, a machine learning classifier may yield a degree of association of a given fragment of natural language text (e.g., represented by a set of morphological, lexical, syntactic, semantic, and/or other attributes) with a certain class of information objects. The classifier parameters may be defined or adjusted by training the classifier using pre-existing and/or dynamically created training data sets that correlate information object classes with morphological, lexical, syntactic, semantic, and/or other attributes of the natural language text. The classification methods may include differential evolution methods, genetic algorithms, random forest methods, neural networks, etc.

Various information extraction techniques may exhibit different performance characteristics, such as extraction precision, recall, and/or computational complexity. Accordingly, various information extraction techniques may produce different results when applied to the same natural language text. Certain information objects extracted by two or more information extraction techniques may be conflicting with each other, e.g., the same natural language word may be recognized as referencing a geographic location or a person's name.

The present disclosure improves the efficiency and quality of information extraction methods by providing systems and methods that employ various combinations of information extraction techniques and then identify and resolve conflicts among the extracted information objects, thus achieving results that exceed conventional methods by the information extraction quality and/or computational efficiency. In an illustrative example, a computer system implementing the method may apply two or more information extraction techniques to the same natural language text. The computer system may then identify sets (e.g., pairs, triplets, quadruplets, etc.) of potentially conflicting objects extracted by different methods, e.g., by detecting overlapping textual annotations and/or violation of various restrictions associated with information object attributes (such as attribute cardinality restrictions). Responsive to identifying a set of conflicting objects, the computer system may attempt to resolve the conflict by applying a conflict arbitration function which may analyze the morphological, lexical, syntactic, semantic, and/or other attributes of the conflicting information objects in order to produce a result validating one or more of the potentially conflicting objects, modifying attributes of one or more of the potentially conflicting objects, deleting one or more of the potentially conflicting objects, and/or merging two or more of the potentially conflicting objects.

In certain implementations, the conflict arbitration function may employ one or more configurable rules evaluating logical conditions defined on morphological, lexical, syntactic, semantic, and/or other attributes of the extracted information objects. Alternatively, the conflict arbitration function may employ one or more machine learning classifiers. In an illustrative example, a classifier employed by the conflict arbitration function may produce a degree of validity of one or more possible arbitration outcomes (e.g., merging two or more potentially conflicting objects into a single object, validating one or more extracted objects, modifying one or more extracted objects, and/or deleting one or more extracted objects). In another illustrative example, a classifier employed by the conflict arbitration function may produce the likelihood of two or more information objects representing the same real life object. In yet another illustrative example, a classifier employed by the conflict arbitration function may produce levels of confidence associated with each information object of the set of conflicting information objects.

The classifiers employed by the conflict arbitration function may be trained using pre-existing and/or dynamically created training data sets that correlate the arbitration outcomes with morphological, lexical, syntactic, semantic, and/or other attributes of the extracted information objects. The classification methods may include differential evolution methods, genetic algorithms, random forest methods, neural networks, etc.

In certain implementations, the training data sets for machine learning classifiers may be produced by applying rule-based methods to sample natural language texts and/or by user verification of classification results produced by the classifiers being trained. In an illustrative example, the machine learning classifiers may be iteratively re-trained using the user-verified classification results, thus progressively improving the classification quality with each training iteration. Such feedback training contours may be applied to the classifiers performing the initial extraction of information objects, as well as the classifiers implementing the arbitration functions, thus progressively improving the overall information extraction quality.

In certain implementations, the definition of the classifier utilized for information extraction may include one or more parameters, values of which may be adjusted by machine learning methods, and may further include one or more hyper-parameters, the values of which may be determined by some extrinsic, with respect to the machine learning, operation or process. In an illustrative example, values of one or more hyper-parameters of the information extraction classifier may iteratively be adjusted by iteratively performing the operations of training the information extraction classifier, training the conflict arbitration classifier, performing the conflict arbitration function, and modifying the hyper-parameter values, thus iteratively optimizing a quality metric evaluating the final list of extracted information objects, as described in more detail herein below.

The systems and methods operating in accordance with one or more aspects of the present disclosure may be utilized for performing various natural language processing operations, such as machine translation, semantic search, object classification and clustering, etc. In certain implementations, the extracted information may be visually represented by a graphical user interface, e.g., by displaying the identifiers of information object classes in visual associations with corresponding fragments of the natural language text.

Various aspects of the above referenced methods and systems are described in details herein below by way of examples, rather than by way of limitation.

FIG. 1 depicts a flow diagram of one illustrative example of a method for information extraction using multiple extraction techniques, in accordance with one or more aspects of the present disclosure. Method 100 and/or each of its individual functions, routines, subroutines, or operations may be performed by one or more processors of the computer system (e.g., computer system 1000 of FIG. 16) implementing the method. In certain implementations, method 100 may be performed by a single processing thread. Alternatively, method 100 may be performed by two or more processing threads, each thread implementing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other.

At block 110, a computer system implementing the method may receive a natural language text. In an illustrative example, the computer system may receive the natural language text in the form of an electronic document, which may be produced by scanning or otherwise acquiring an image of a paper document, and performing optical character recognition (OCR) to produce the document text. In an illustrative example, the computer system may receive the natural language text in the form of one or more formatted files, such as word processing files, electronic mail messages, digital content files, etc.

At block 120, the computer system may apply, to the natural language text, a first information extraction technique. In certain implementations, the first information extraction technique may utilize configurable rule sets, automatic classification methods (also known as "machine learning classifiers"), heuristic-based approaches, and/or their combinations. Applying the first information extraction technique to the natural language text may produce a plurality of information objects of one or more information object types.

In an illustrative example, the first information extraction technique may utilize a set of configurable production rules to interpret a set of syntactico-semantic structures produced by a syntactico-semantic analysis of the natural language text. Each semantic structure may represent a corresponding natural language sentence. A semantic structure may be represented by an acyclic graph that includes a plurality of nodes corresponding to semantic classes and a plurality of edges corresponding to semantic relationships, as described in more detail herein below with reference to FIG. 15.

The production rules applied to the set of semantic structures may include interpretation rules and identification rules. An interpretation rule may include a left-hand side represented by a set of logical expressions defined on one or more semantic structure templates and a right-hand side represented by one or more statements regarding the information objects representing the entities referenced by the natural language text. A semantic structure template may comprise certain semantic structure elements (e.g., association with a certain lexical/semantic class, association with a certain surface or deep slot in a specified position of the semantic structure, presence of parent-child relationships between certain nodes of the semantic structure and the number of semantic hierarchy levels between the parent and child classes in a certain ontology, presence of a common ancestor for certain nodes of the semantic structure, presence of certain grammemes or semantemes, etc.). The relationships between the semantic structure elements may be specified by one or more logical expressions (conjunction, disjunction, and negation) and/or by operations describing mutual positions of nodes within the syntactico-semantic tree. In an illustrative example, such an operation may verify whether one node belongs to a subtree of another node.

The right-hand side of the production rule may assign and/or modify values of one or more information object attributes reflecting morphological, lexical, syntactic, and/or semantic attributes of a fragment of the natural language text. In an illustrative example, the right-hand side of an interpretation rule may comprise a statement associating a fragment of the natural language text with a class of information objects.

An identification rule may be employed to associate a pair of information objects which represent the same real world entity. An identification rule is a production rule, the left-hand side of which comprises one or more logical expressions referencing the semantic tree nodes corresponding to the information objects. If the pair of information objects satisfies the conditions specified by the logical expressions, the information objects are merged into a single information object.

In an illustrative example, the first information extraction technique may utilize one or more machine learning classifiers. Each machine learning classifier may yield a degree of association of a given fragment of natural language text (e.g., represented by a set of morphological, lexical, syntactic, semantic, and/or other attributes) with a certain class of information objects. The computer system may iterate through a plurality of fragments of the natural language text and determine, for each textual fragment, its degree of association with one or more classes of information objects. The classification methods may include differential evolution methods, genetic algorithms, random forest methods, neural networks, etc.

The classifiers may be trained using pre-existing and/or dynamically created training data sets that correlate information object classes with lexical, syntactic, semantic, and/or other attributes of the natural language text. A training data set may comprise one or more natural language texts accompanied by the metadata that specifies certain information objects, their classification, attributes, and the respective textual annotations. In an illustrative example, the metadata may be provided by a markup associated with the natural language text. In certain implementations, the training data set may be iteratively enhanced by appending new natural language texts accompanied by the user-validated metadata. The metadata validation may involve receiving, via a graphical user interface (GUI), user input confirming or adjusting the extracted information objects and their attributes.

The extracted information objects may be represented by an RDF graph. The Resource Definition Framework assigns a unique identifier to each information object and stores the information regarding such an object in the form of SPO triplets, where S stands for "subject" and contains the identifier of the object, P stands for "predicate" and identifies some property of the object, and O stands for "object" and stores the value of that property of the object. This value can be either a primitive data type (string, number, Boolean value) or an identifier of another object. In an illustrative example, an SPO triplet may associate a fragment of the natural language text with a category of information objects.

In certain implementations, the information extraction techniques may rely upon ontologies and/or other document models in order to analyze lexical, syntactic, sematic, and/or other attributes of the natural language texts. Thus, the information extraction operations referenced by block 120 may be preceded by one or more document pre-processing operations that are performed in order to determine the document structure and identify a corresponding document model. In an illustrative example, the document structure may include a multi-level hierarchical structure, in which document sections are delimited by headings and sub-headings. In another illustrative example, the document structure may include one or more tables containing multiple rows and columns, at least some of which may be associated with headers, which in turn may be organized in a multi-level hierarchy. In yet another illustrative example, the document structure may include a page structure containing a page header, a page body, and/or a page footer. In another illustrative example, the document structure may include certain text fields associated with pre-defined information types, such as a signature field, a date field, an address field, a name field, etc. The computer system implementing method 100 may interpret the document structure to derive certain document structure information that may be utilized to enhance the textual information comprised by the document. In certain implementations, in analyzing structured documents, the computer system may employ various auxiliary ontologies comprising classes and concepts reflecting a specific document structure. Auxiliary ontology classes may be associated with certain production rules and/or classifier functions that may be applied to the plurality of semantic structures produced by the syntactico-semantic analysis of the corresponding document in order to impart, into the resulting set of semantic structures, certain information conveyed by the document structure.

At block 130, the computer system may apply, to the natural language text, a second information extraction technique, which is different from the first information extraction technique. In certain implementations, the second information extraction technique may utilize configurable rule sets, automatic classification methods (also known as "machine learning classifiers"), heuristic-based approaches, and/or their combinations, as described in more detail herein below with reference to block 120. Applying the second information extraction technique may produce a second plurality of information objects, which may be different from the first plurality of information objects produced by the first information extraction technique.

While FIG. 1 only shows two pluralities of information objects which are extracted by two different information extraction techniques, various implementations of method 100 may apply two or more different information extraction techniques to extract two or more pluralities of information objects.

At block 140, the computer system may produce an intermediate list of information objects, which may include at least a subset of each of the pluralities of information objects extracted by different information extraction techniques at blocks 120-130. In an illustrative example, the computer system may include, into the intermediate list, information objects associated with one or more pre-defined classes of information objects, while discarding information objects associated with other classes. In another illustrative example, the computer system may exclude, from the intermediate list, information objects of one or more pre-defined classes of information objects. As explained herein above, the intermediate list may include one or more sets of potentially conflicting information objects, whose co-existence violates one or more pre-determined rules (such as overlapping textual annotations or attribute cardinality restrictions). The intermediate list may be represented by an RDF graph producing by merging the RDF graphs representing the respective pluralities of extracted information objects.

At block 150, the computer system may identify one or more sets of conflicting information objects, such that each set includes two or more information objects, at least two of which have been extracted by different information extraction techniques. In an illustrative example, a set of conflicting information object may comprise two information objects, such that the first information object belongs to the first plurality of information objects which has been extracted by the first information extraction technique, while the second information object belongs to the second plurality of information objects which has been extracted by the second information extraction technique.

In an illustrative example, identifying potentially conflicting information objects may involve identifying extracted information objects which have at least partially overlapping textual annotations. The computer system implementing the method may iterate through the intermediate list of extracted information object in an attempt to identify sets of information objects (e.g., pairs, triplets, quadruplets, etc.) which have overlapping textual annotations. In certain implementations, the computer system may determine that two or more extracted information objects are potentially conflicting if their respective annotations overlap by at least a threshold number of words.

In another illustrative example, identifying potentially conflicting information objects may involve identifying various restrictions associated with information object attributes. In certain implementations, the computer system implementing the method may evaluate logical conditions defined on information object attributes (e.g., comparing an attribute of one information object to an attribute of another information object). In an illustrative example, the computer system may detect a violation of an attribute cardinality restriction by identifying an information object having the number of attributes of a certain type exceeding the maximum number of attributes of such type (e.g., a person may have only one date of birth and one place of birth). Cardinality and other restrictions may be specified by a document model or ontology associated with the document being processed.

At block 160, the computer system may apply a conflict arbitration function to each detected set of conflicting information objects in order to resolve the conflicts in the intermediate list of information objects, thus producing a final list of information objects extracted from the natural language texts. For each set of conflicting information objects, the conflict arbitration function may resolve the conflict by analyzing the morphological, lexical, syntactic, semantic, and/or other attributes of the conflicting information objects in order to produce a result validating one or more of the potentially conflicting objects, modifying one or more of the potentially conflicting objects, deleting one or more of the potentially conflicting objects, and/or merging two or more of the potentially conflicting objects. The computer system may modify, based on the arbitration function output, the RDF graph representing the intermediate list of extracted information objects, thus producing the final RDF graph.

Figure 2:
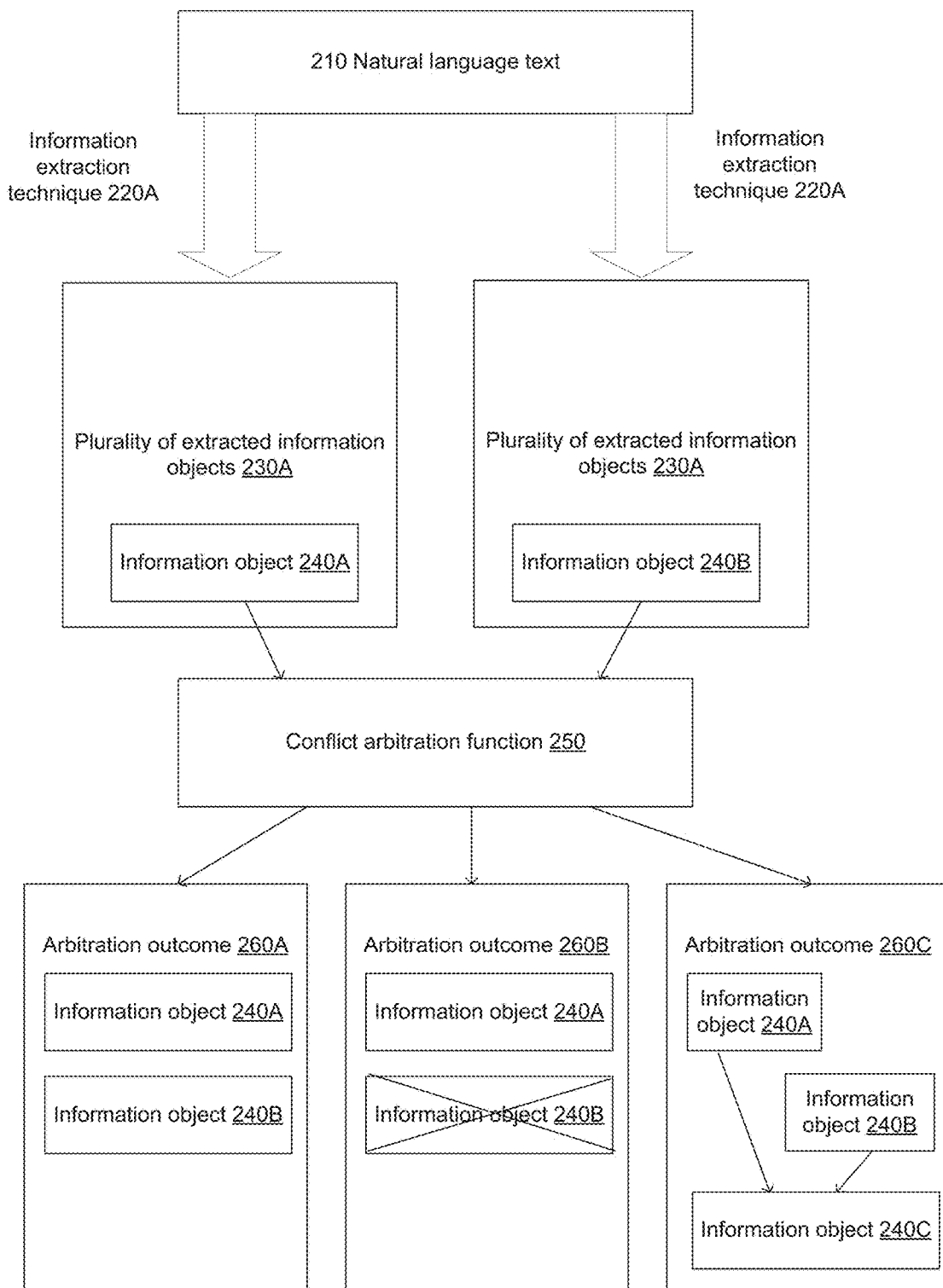
FIG. 2 schematically illustrates an example of conflict arbitration which may be performed in accordance with one or more aspects of the present disclosure, in accordance with one or more aspects of the present disclosure.

FIG. 2 schematically illustrates an example of conflict arbitration which may be performed in accordance with one or more aspects of the present disclosure. As shown in FIG. 2, applying, to the natural language text 210, the first information extraction technique 220A produces the first plurality of information objects 230A, while applying, to the natural language text 210, the second information extraction technique 220B produces the first plurality of information objects 230B. The first plurality of information objects 230A may include an information object 240A, which may be potentially conflicting with an information object 240B comprised by the second plurality of information objects 230B. Applying the conflict arbitration function 250 to the potentially conflicting information objects 260 may produce one of the arbitration outcomes 260. The arbitration outcome 260A involves validating both information objects 240A and 240B and modifying at least some of their attributes (e.g., by changing the information object class and thus resolving the apparent conflict). The arbitration outcome 260B involves deleting the information object 240B. At least some of the attributes of the deleted information object 240B may be copied to the remaining information object 240A. The arbitration outcome 260C involves merging the information objects 240A and 240B into a new information object 240C.

In certain implementations, the conflict arbitration function may employ one or more configurable production rules evaluating logical conditions defined on morphological, lexical, syntactic, semantic, and/or other attributes of the extracted information objects. In an illustrative example, the attributes of extracted information objects evaluated by the production rules may include the confidence levels associated with respective information objects. The confidence level values may be produced by the information extraction techniques employed at blocks 120-130.

Alternatively, the conflict arbitration function may employ one or more machine learning classifiers. In an illustrative example, a classifier employed by the conflict arbitration function may produce a degree of validity of one or more possible arbitration outcomes (e.g., merging two or more potentially conflicting objects into a single object, validating one or more extracted objects, modifying one or more extracted objects, and/or deleting one or more extracted objects). In another illustrative example, a classifier employed by the conflict arbitration function may produce the likelihood of two or more information objects representing the same real life object. Should the likelihood exceed a threshold value, the conflict arbitration function may merge the identified information objects. In another illustrative example, a classifier employed by the conflict arbitration function may produce levels of confidence associated with each information object of the set of conflicting information objects. The conflict arbitration function may delete one or more information objects having the lowest confidence levels and/or confidence levels falling below a pre-defined threshold.

The classifiers employed by the conflict arbitration function may be trained using pre-existing and/or dynamically created training data sets that correlate the arbitration outcomes with morphological, lexical, syntactic, semantic, and/or other attributes of the extracted information objects. In certain implementations, the attributes of extracted information objects evaluated by the machine learning classifiers may include the confidence levels associated with respective information objects. The classification methods may include differential evolution methods, genetic algorithms, random forest methods, neural networks, etc.

The classifier may be trained using pre-existing and/or dynamically created training data sets that correlates possible arbitration outcomes with lexical, syntactic, semantic, and/or other attributes of the natural language text. A training data set may comprise one or more natural language texts accompanied by the metadata that specifies sets of conflicting information objects, their classification, attributes, and the respective arbitration outcomes. In an illustrative example, the metadata may be provided by a markup associated with the natural language text. In certain implementations, the training data set may be iteratively enhanced by appending new natural language texts accompanied by the user-validated metadata. The metadata validation may involve receiving, via a graphical user interface (GUI), user input confirming or adjusting the extracted information objects and their attributes. In certain implementations, the user-validated natural language texts and accompanying metadata specifying the extracted information object, their attributes, and textual annotations may be utilized for forming or updating training data sets utilized for classifier training, as described in more detail herein below.

Referring again to FIG. 1, at block 170, the computer system may utilize the final list of information objects for performing a natural language processing task or operation, including machine translation, semantic indexing, semantic search (including multi-lingual semantic search), document classification, electronic discovery, etc. In certain implementations, the computer system may display the extracted information objects with visual references with corresponding natural language text fragments, and may accept user input confirming or modifying the object classification and/or textual annotations.

In certain implementations, the definition of the classifier utilized for information extraction may include one or more parameters, values of which may be adjusted by machine learning methods, and may further include one or more hyper-parameters, the values of which may be determined by some extrinsic, with respect to the machine learning, operation or process. In other words, the values of the hyper-parameters of the classifier are determined before applying the machine learning methods to fine-tune the parameters of the classifier.

In an illustrative example, a hyper-parameter of the information extraction classifier may be provided by the regularization parameter of a gradient boost classifier. In another illustrative example, a hyper-parameter of the information extraction classifier may be provided by (3 parameter of the F-measure metric produced by evaluating the information objects yielded by the classifier, which is defined as follows:

$$F_\beta = (1+\beta^2)*(\text{Precision}*\text{Recall})/((\beta^2*\text{Precision})+\text{Recall}),$$

where $\text{Precision}=t_p/(t_p+f_p)$ and $\text{Recall}=t_p/(t_p+f_n)$, $t_p$ is the number of true positive outcomes (correctly classified extracted information objects), $f_p$ is the number of false positive outcomes (an information object which does not belong to a certain class has been classified as belonging to that class), and $f_n$ is the number of false negative outcomes (an information object belonging to a certain class has not been classified as belonging to that class).

Figure 3:
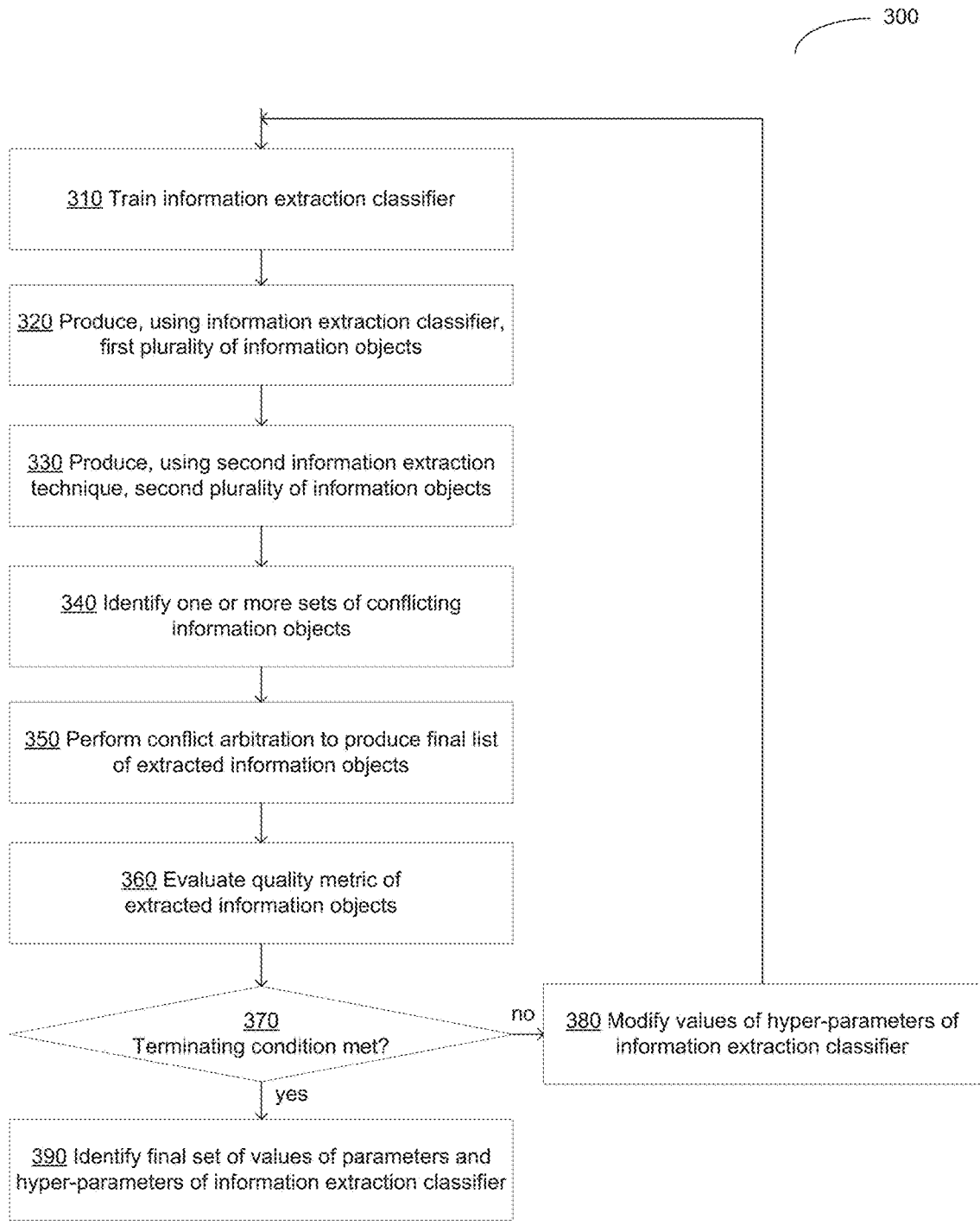
FIG. 3 depicts a flow diagram of an example method of training a classifier utilized for information extraction from natural language texts, in accordance with one or more aspects of the present disclosure.

In certain implementations, values of one or more hyper-parameters of the information extraction classifier may iteratively be adjusted by iteratively performing the operations of training the information extraction classifier, training the conflict arbitration classifier, performing the conflict arbitration function, and modifying the hyper-parameter values based on the outcome of the conflict arbitration, thus iteratively optimizing a quality metric evaluating the final list of extracted information objects, as described in more detail herein below with reference to FIG. 3.

FIG. 3 depicts a flow diagram of an example method of training a classifier utilized for information extraction from natural language texts, in accordance with one or more aspects of the present disclosure. Method 300 and/or each of its individual functions, routines, subroutines, or operations may be performed by one or more processors of the computer system (e.g., computer system 1000 of FIG. 16) implementing the method. In certain implementations, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a computer system implementing the method may train an information extraction classifier to extract a plurality of information objects from a natural language text. In certain implementations, the definition of the classifier may include one or more parameters, the values of which are adjusted by the classifier training operation, and may further include one or more hyper-parameters, the values of which may be determined by some extrinsic, with respect to the machine learning, operation or process. In an illustrative example, a hyper-parameter of the information extraction classifier may be provided by the regularization parameter of a gradient boost classifier. In another illustrative example, a hyper-parameter of the information extraction classifier may be provided by β parameter of the F-measure metric produced by evaluating the information objects yielded by the classifier.

In an illustrative example, an annotated text corpus utilized for training the information extraction classifier may be partitioned into a training data set and a validation data set. The training data set may then be used for determining the values of the classifier parameters, while the validation data set may be utilized for calculating the information extraction quality metric (e.g., represented by the parameterized F-measure). In an illustrative example, the training process may involve adjusting one or more parameters of the information extraction classifier until the chosen quality metric applied to the extracted information objects meets a pre-defined threshold.

Partitioning the text corpus may comprise cross-validating the training data set and the validation data set. In order to reduce the result variability, multiple iterations of cross-validation may be performed using different partitions, and the model validation results may be aggregated (e.g., averaged) over the iterations. In an illustrative example, a k-fold cross-validation method may be applied to the corpus of natural language texts. The method may involve randomly partitioning the original text corpus into k equal sized data sets, one of which is then utilized as the validation data set, and the remaining k−1 subsets are utilized as training data sets. The cross-validation process may then repeated k times, so that each of the k data sets would once be used as the validation data. The k results may then be aggregated to produce a single estimation.

At block 320, the computer system may apply the information extraction classifier to the validation data set, thus producing a first plurality of information objects.

At block 330, the computer system may apply, to the same validation data set, a second information extraction technique, which is different from the above-referenced information extraction classifier, thus producing a second plurality of information objects. In an illustrative example, the second information extraction technique may utilize a set of configurable production rules to interpret a set of syntactico-semantic structures produced by a syntactico-semantic analysis of the natural language text, as described in more detail herein above. In another illustrative example, the second information extraction technique may utilize one or more machine learning classifiers, which are different from the above-referenced information extraction classifier which has been employed for extracting the first plurality of information objects.

At block 340, the computer system may identify one or more sets of conflicting information objects, such that each set includes two or more information objects, at least two of which have been extracted by different information extraction techniques. In an illustrative example, a set of conflicting information object may comprise two information objects, such that the first information object belongs to the first plurality of information objects which has been extracted by the information extraction classifier, while the second information object belongs to the second plurality of information objects which has been extracted by the second information extraction technique, as described in more detail herein above.

At block 350, the computer system may apply a conflict arbitration function to each detected set of conflicting information objects in order to resolve the conflicts, thus producing a final list of information objects extracted from the natural language texts, as described in more detail herein above.

In an illustrative example, the conflict arbitration function may be implemented by a machine learning classifier trained to produce a degree of validity of one or more possible arbitration outcomes (e.g., merging two or more potentially conflicting objects into a single object, validating one or more extracted objects, modifying one or more extracted objects, and/or deleting one or more extracted objects). In another illustrative example, a classifier employed by the conflict arbitration function may produce the likelihood of two or more information objects representing the same real life object. Should the likelihood exceed a threshold value, the conflict arbitration function may merge the identified information objects. In another illustrative example, a classifier employed by the conflict arbitration function may produce levels of confidence associated with each information object of the set of conflicting information objects. The conflict arbitration function may delete one or more information objects having the lowest confidence levels and/or confidence levels falling below a pre-defined threshold.

Alternatively, the conflict arbitration function may be implemented by one or more configurable rules evaluating logical conditions defined on morphological, lexical, syntactic, semantic, and/or other attributes of the extracted information objects, as described in more detail herein above.

At block 360, the computer system may evaluate a pre-defined quality metric applied to the final set of the extracted information objects. In an illustrative example, the quality metric may be provided by the F-measure.

Responsive to determining, at block 370, that a pre-defined terminating condition has not been met, the processing may continue at block 380 by modifying the values of one or more hyper-parameters of the information extraction classifier. In an illustrative example, the hyper-parameter may be provided by the $\beta$ parameter of the F-measure metric utilized to evaluate the information extraction quality. Accordingly, the computer system may modify the value of the $\beta$ parameter in order to maximize the precision or the recall of the results produced by the information extraction classifier. In certain implementations, the computer system may implement a grid search, by iteratively changing the values of one or more hyper-parameters by pre-defined increments while the parameters remain within certain ranges, thus optimizing the quality metric applied to the final set of the extracted information objects. Upon completing the operations of block 380, the method may loop back to block 310.

Responsive to determining, at block 370, that the terminating condition has been met, the method may exit the loop and continue processing at block 390. In an illustrative example, the terminating condition may specify the maximum number of iterations to be performed. Responsive to performing the specified number of iterations, the computer system may, at block 390, identify, among the values of the above-referenced pre-defined quality metric evaluated at block 370 which have been produced in all performed iterations, the optimal (e.g., maximal or minimal) value of the quality metric, and may accordingly identify the values of the hyper-parameters of the information extraction classifier that were utilized at the iteration which has yielded the optimal quality metric.

In another illustrative example, the terminating condition being evaluated at block 370 may specify a threshold value to be met by the quality metric which has been evaluated at block 370. Responsive to determining that the quality metric meets the specified threshold value, the computer system may, at block 390, identify the values of the hyper-parameters of the information extraction classifier that were utilized at the last performed iteration, which has yielded the quality metric value satisfying the terminating condition. Responsive to identifying the values of the hyper-parameters of the information extraction classifier, the method may terminate. The trained information extraction classifier may then be utilized by method 100 for information extraction.

As noted herein above, in certain implementations, the conflict arbitration function may be performed by a machine learning classifier. The definition of such a classifier may include one or more parameters, values of which may be adjusted by machine learning methods, and may further include one or more hyper-parameters, the values of which may be determined by some extrinsic, with respect to the machine learning, operation or process. In other words, the values of the hyper-parameters of the classifier are determined before applying the machine learning methods to fine-tune the parameters of the classifier.

In an illustrative example, a hyper-parameter of the conflict arbitration classifier may be provided by the regularization parameter of a gradient boost classifier. In another illustrative example, a hyper-parameter of the conflict arbitration classifier may be provided by β parameter of the F-measure metric produced by evaluating the information objects yielded by the classifier.

In certain implementations, values of one or more hyper-parameters of the conflict arbitration classifier may iteratively be adjusted by iteratively performing the operations of extracting the first plurality of information objects, extracting the second plurality of information objects, modifying the values of the hyper-parameters based on the quality of information extraction, and training the conflict arbitration classifier, thus iteratively optimizing a quality metric evaluating the final list of extracted information objects. In certain implementations, the computer system may implement a grid search, by iteratively changing the values of one or more hyper-parameters by pre-defined increments while the parameters remain within certain ranges, thus optimizing the quality metric applied to the final set of the extracted information objects, as described in more detail herein below with reference to FIG. 4.

Figure 4:
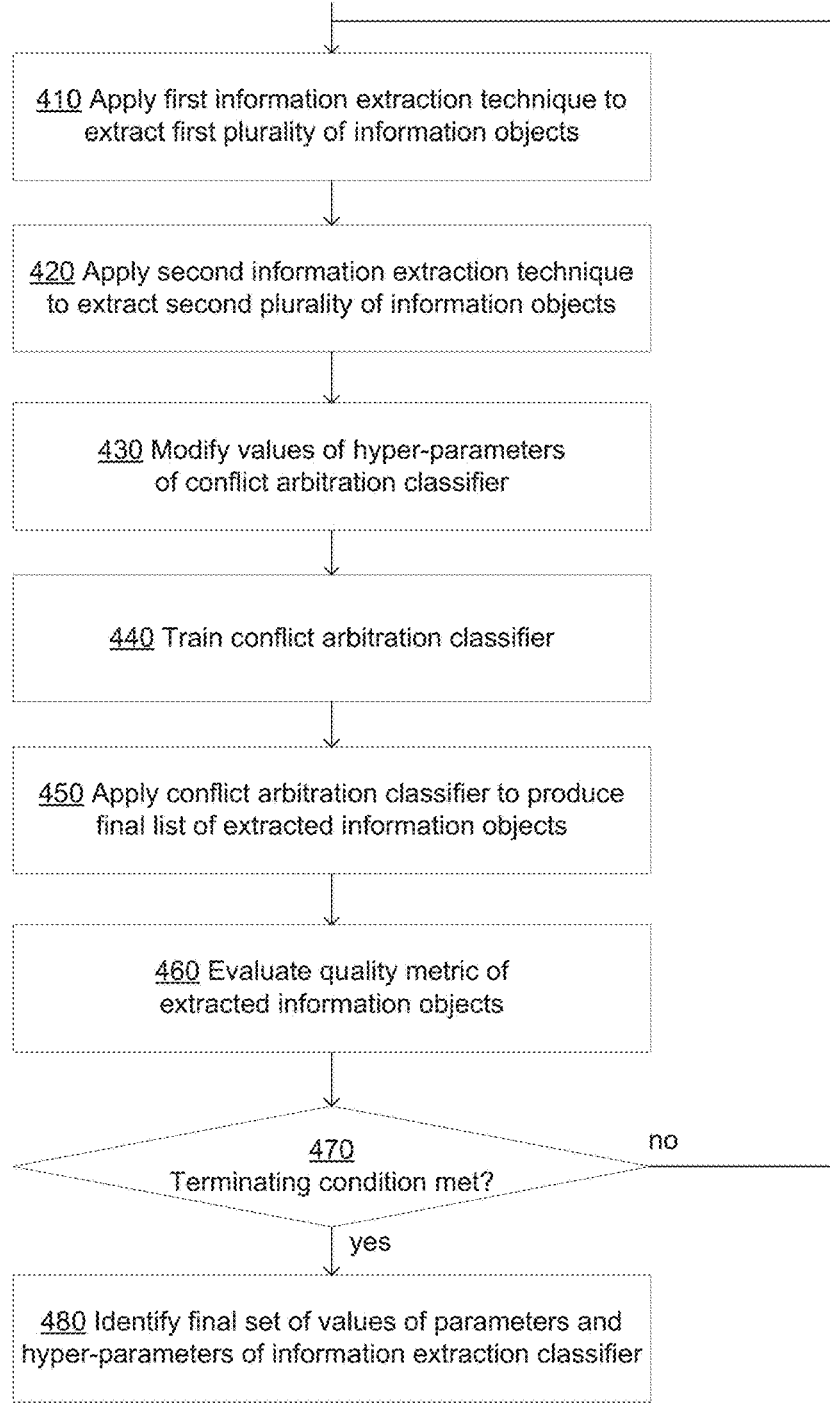
FIG. 4 depicts a flow diagram of another example method of training a classifier utilized for information extraction from natural language texts, in accordance with one or more aspects of the present disclosure.

FIG. 4 depicts a flow diagram of another example method of training a classifier utilized for information extraction from natural language texts, in accordance with one or more aspects of the present disclosure. Method 400 and/or each of its individual functions, routines, subroutines, or operations may be performed by one or more processors of the computer system (e.g., computer system 1000 of FIG. 16) implementing the method. In certain implementations, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, a computer system implementing the method may apply, to a natural language text, a first information extraction technique. In certain implementations, the first information extraction technique may utilize configurable rule sets, automatic classification methods (also known as "machine learning classifiers"), heuristic-based approaches, and/or their combinations. Applying the first information extraction technique to the natural language text may produce a second plurality of information objects of one or more information object types.

At block 420, the computer system may apply, to the natural language text, a second information extraction technique, which is different from the first information extraction technique. In certain implementations, the second information extraction technique may utilize configurable rule sets, automatic classification methods (also known as "machine learning classifiers"), heuristic-based approaches, and/or their combinations. Applying the second information extraction technique to the natural language text may produce a second plurality of information objects, which may be different from the first plurality of information objects produced by the first information extraction technique.

At block 430, the computer system may modify values of one or more hyper-parameters of a conflict arbitration classifier. In an illustrative example, a hyper-parameter may be provided by the regularization parameter of a gradient boost classifier. In another illustrative example, a hyper-parameter may be provided by β parameter of the F-measure metric produced by evaluating the information objects yielded by the classifier. In certain implementations, the computer system may implement a grid search, by iteratively changing the values of one or more hyper-parameters by pre-defined increments while the parameters remain within certain ranges, thus optimizing the quality metric applied to the final set of the extracted information objects.

At block 440, the computer system may train the conflict arbitration classifier to perform conflict arbitration function with respect to a set of conflicting information objects in order to produce a final list of extracted information objects. In an illustrative example, a set of conflicting information object may comprise two information objects, such that the first information object belongs to the first plurality of information objects which has been extracted by the information extraction classifier, while the second information object belongs to the second plurality of information objects which has been extracted by the second information extraction technique, as described in more detail herein above.

In an illustrative example, a classifier employed by the conflict arbitration function may produce a degree of validity of one or more possible arbitration outcomes (e.g., merging two or more potentially conflicting objects into a single object, validating one or more extracted objects, modifying one or more extracted objects, and/or deleting one or more extracted objects). In another illustrative example, a classifier employed by the conflict arbitration function may produce the likelihood of two or more information objects representing the same real life object. Should the likelihood exceed a threshold value, the conflict arbitration function may merge the identified information objects. In another illustrative example, a classifier employed by the conflict arbitration function may produce levels of confidence associated with each information object of the set of conflicting information objects. The conflict arbitration function may delete one or more information objects having the lowest confidence levels and/or confidence levels falling below a pre-defined threshold.

In certain implementations, the definition of the conflict arbitration classifier may include one or more parameters, the values of which are adjusted by the classifier training operation, and may further include one or more hyper-parameters, the values of which may be determined by some extrinsic, with respect to the machine learning, operation or process.

The classification methods may include differential evolution methods, genetic algorithms, random forest methods, neural networks, etc. In an illustrative example, the training process may involve adjusting one or more parameters of the information extraction classifier until the chosen quality metric meets a pre-defined threshold.

The classifiers employed by the conflict arbitration function may be trained using pre-existing and/or dynamically created training data sets that correlate the arbitration outcomes with morphological, lexical, syntactic, semantic, and/or other attributes of the extracted information objects.

A training data set may comprise one or more natural language texts accompanied by the metadata that specifies sets of conflicting information objects, their classification, attributes, and the respective arbitration outcomes. In an illustrative example, the metadata may be provided by a markup associated with the natural language text. In certain implementations, the training data set may be iteratively enhanced by appending new natural language texts accompanied by the user-validated metadata. The metadata validation may involve receiving, via a graphical user interface (GUI), user input confirming or adjusting the extracted information objects and their attributes.

In an illustrative example, an annotated text corpus utilized for training the conflict arbitration classifier may be partitioned into a training data set and a validation data set. The training data set may then be used for determining the values of the classifier parameters, while the validation data set may be utilized for calculating the information extraction quality metric (e.g., represented by the parameterized F-measure). In an illustrative example, the training process may involve adjusting one or more parameters of the conflict arbitration classifier until the chosen quality metric applied to the final list of extracted information objects meets a pre-defined threshold.

At block 450, the computer system may apply a conflict arbitration function to each detected set of conflicting information objects in order to resolve the conflicts, thus producing a final list of information objects extracted from the natural language texts, as described in more detail herein above.

At block 460, the computer system may evaluate a pre-defined quality metric applied to the final set of the extracted information objects. In an illustrative example, the quality metric may be provided by the F-measure.

Responsive to determining, at block 470, that a pre-defined terminating condition has not been met, the method may loop back to block 410; otherwise, the method may exit the loop and continue processing at block 480. In an illustrative example, the terminating condition may specify the maximum number of iterations to be performed. Responsive to performing the specified number of iterations, the computer system may, at block 470, identify, among the values of the above-referenced pre-defined quality metric evaluated at block 460 which have been produced in all performed iterations, the optimal (e.g., maximal or minimal) value of the quality metric, and may accordingly identify the values of the hyper-parameters of the conflict arbitration classifier that were utilized at the iteration which has yielded the optimal quality metric.

In another illustrative example, the terminating condition being evaluated at block 470 may specify a threshold value to be met by the quality metric which has been evaluated at block 460. Responsive to determining that the quality metric meets the specified threshold value, the computer system may, at block 490, identify the values of the hyper-parameters of the information extraction classifier that were utilized at the last performed iteration, which has yielded the quality metric value satisfying the terminating condition. Responsive to identifying the values of the hyper-parameters of the conflict arbitration classifier, the method may terminate. The trained conflict arbitration classifier may then be utilized by method 100 for information extraction.

As noted herein above, production rules, classifiers, and/or other information extraction and conflict arbitration techniques may analyze various morphological, lexical, syntactic, sematic, and/or other attributes of the natural language text. Such attributes may be produced by performing syntactico-semantic analysis of the natural language text, as schematically illustrated by FIG. 5.

Figure 5:
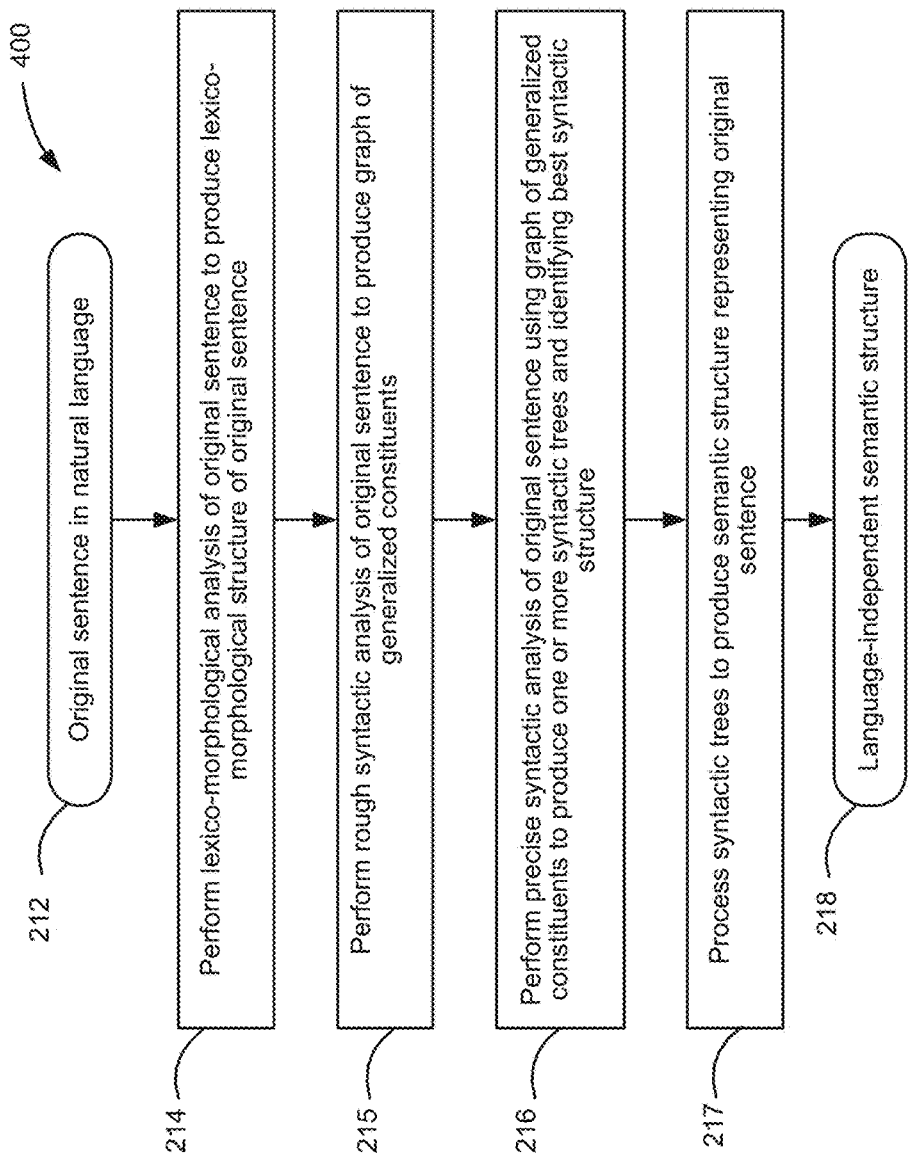
FIG. 5 depicts a flow diagram of one illustrative example of a method 400 for performing a semantico-syntactic analysis of a natural language sentence, in accordance with one or more aspects of the present disclosure.

FIG. 5 depicts a flow diagram of one illustrative example of a method 400 for performing a semantico-syntactic analysis of a natural language sentence 212, in accordance with one or more aspects of the present disclosure. Method 400 may be applied to one or more syntactic units (e.g., sentences) comprised by a certain text corpus, in order to produce a plurality of semantico-syntactic trees corresponding to the syntactic units. In various illustrative examples, the natural language sentences to be processed by method 400 may be retrieved from one or more electronic documents which may be produced by scanning or otherwise acquiring images of paper documents and performing optical character recognition (OCR) to produce the texts associated with the documents. The natural language sentences may be also retrieved from various other sources including electronic mail messages, social networks, digital content files processed by speech recognition methods, etc.

At block 214, the computer system implementing the method may perform lexico-morphological analysis of sentence 212 to identify morphological meanings of the words comprised by the sentence. "Morphological meaning" of a word herein shall refer to one or more lemma (i.e., canonical or dictionary forms) corresponding to the word and a corresponding set of values of grammatical attributes defining the grammatical value of the word. Such grammatical attributes may include the lexical category of the word and one or more morphological attributes (e.g., grammatical case, gender, number, conjugation type, etc.). Due to homonymy and/or coinciding grammatical forms corresponding to different lexico-morphological meanings of a certain word, two or more morphological meanings may be identified for a given word. An illustrative example of performing lexico-morphological analysis of a sentence is described in more detail herein below with references to FIG. 6.

At block 215, the computer system may perform a rough syntactic analysis of sentence 212. The rough syntactic analysis may include identification of one or more syntactic models which may be associated with sentence 212 followed by identification of the surface (i.e., syntactic) associations within sentence 212, in order to produce a graph of generalized constituents. "Constituent" herein shall refer to a contiguous group of words of the original sentence, which behaves as a single grammatical entity. A constituent comprises a core represented by one or more words, and may further comprise one or more child constituents at lower levels. A child constituent is a dependent constituent and may be associated with one or more parent constituents.

At block 216, the computer system may perform a precise syntactic analysis of sentence 212, to produce one or more syntactic trees of the sentence. The pluralism of possible syntactic trees corresponding to a given original sentence may stem from homonymy and/or coinciding grammatical forms corresponding to different lexico-morphological meanings of one or more words within the original sentence. Among the multiple syntactic trees, one or more best syntactic tree corresponding to sentence 212 may be selected, based on a certain rating function talking into account compatibility of lexical meanings of the original sentence words, surface relationships, deep relationships, etc.

At block 217, the computer system may process the syntactic trees to the produce a semantic structure 218 corresponding to sentence 212. Semantic structure 218 may comprise a plurality of nodes corresponding to semantic classes, and may further comprise a plurality of edges corresponding to semantic relationships, as described in more detail herein below.

Figure 6:
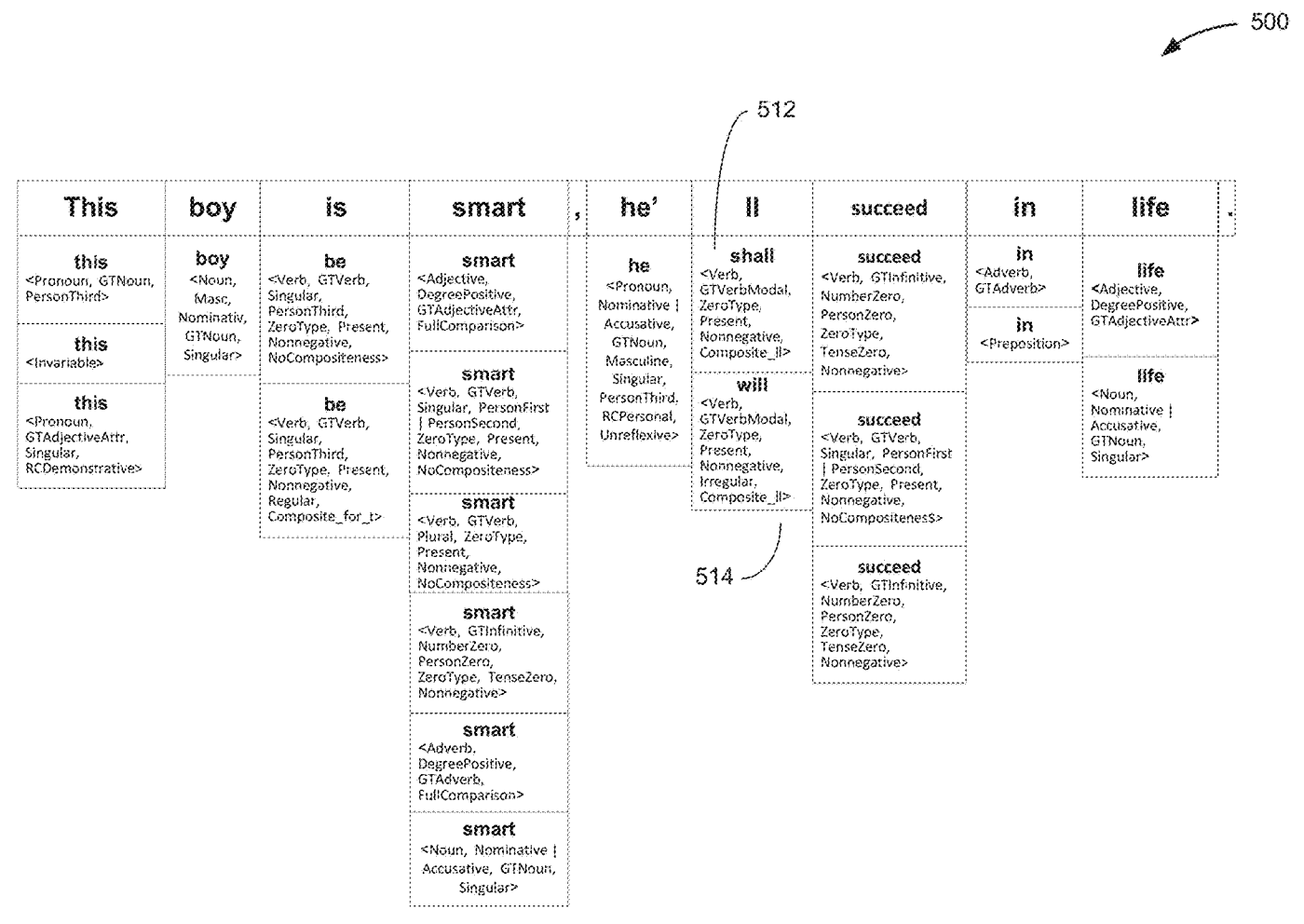

FIG. 6 schematically illustrates an example of a lexico-morphological structure of a sentence, in accordance with one or more aspects of the present disclosure. Example lexical-morphological structure 500 may comprise having a plurality of "lexical meaning-grammatical value" pairs for an example sentence. In an illustrative example, "ll" may be associated with lexical meaning "shall" 512 and "will" 514. The grammatical value associated with lexical meaning 512 is <Verb, GTVerbModal, ZeroType, Present, Nonnegative, Composite II>. The grammatical value associated with lexical meaning 514 is <Verb, GTVerbModal, ZeroType, Present, Nonnegative, Irregular, Composite II>.

Figure 7:
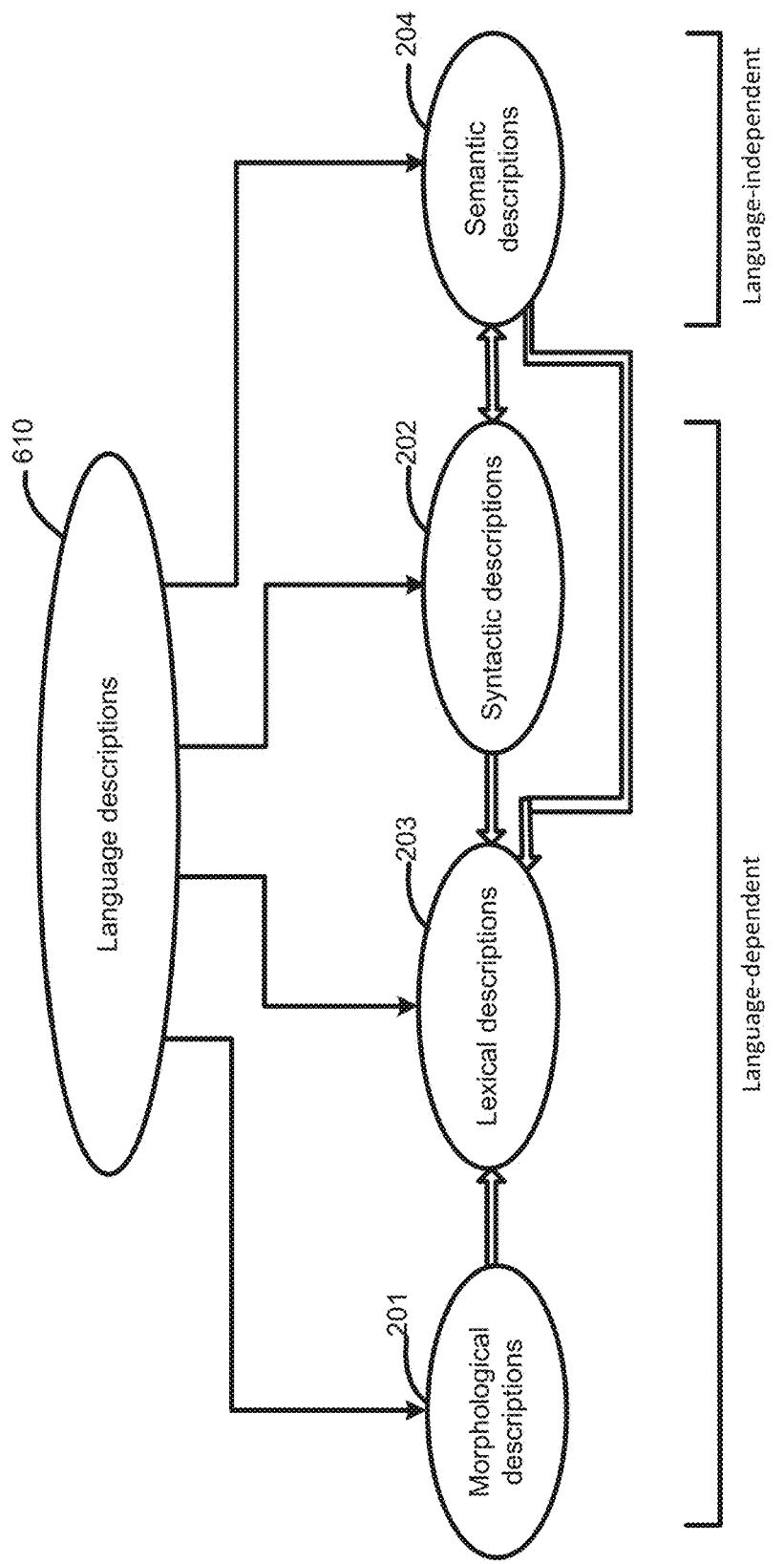
FIG. 7 schematically illustrates language descriptions representing a model of a natural language, in accordance with one or more aspects of the present disclosure.

FIG. 7 schematically illustrates language descriptions 610 including morphological descriptions 201, lexical descriptions 203, syntactic descriptions 202, and semantic descriptions 104, and their relationship thereof. Among them, morphological descriptions 201, lexical descriptions 203, and syntactic descriptions 202 are language-specific. A set of language descriptions 610 represent a model of a certain natural language.

In an illustrative example, a certain lexical meaning of lexical descriptions 203 may be associated with one or more surface models of syntactic descriptions 202 corresponding to this lexical meaning. A certain surface model of syntactic descriptions 202 may be associated with a deep model of semantic descriptions 204.

Figure 8:
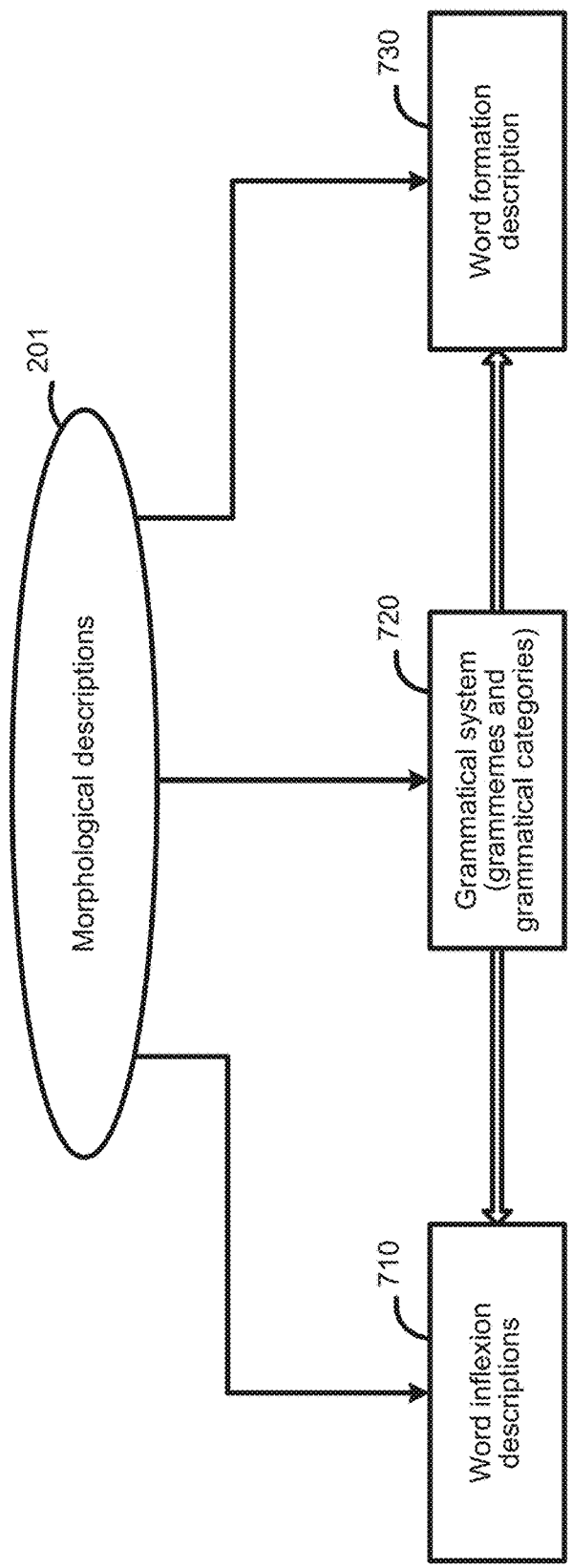
FIG. 8 schematically illustrates examples of morphological descriptions, in accordance with one or more aspects of the present disclosure.

FIG. 8 schematically illustrates several examples of morphological descriptions. Components of the morphological descriptions 201 may include: word inflexion descriptions 710, grammatical system 720, and word formation description 730, among others. Grammatical system 720 comprises a set of grammatical categories, such as, part of speech, grammatical case, grammatical gender, grammatical number, grammatical person, grammatical reflexivity, grammatical tense, grammatical aspect, and their values (also referred to as "grammemes"), including, for example, adjective, noun, or verb; nominative, accusative, or genitive case; feminine, masculine, or neutral gender; etc. The respective grammemes may be utilized to produce word inflexion description 710 and the word formation description 730.

Word inflexion descriptions 710 describe the forms of a given word depending upon its grammatical categories (e.g., grammatical case, grammatical gender, grammatical number, grammatical tense, etc.), and broadly includes or describes various possible forms of the word. Word formation description 730 describes which new words may be constructed based on a given word (e.g., compound words).

According to one aspect of the present disclosure, syntactic relationships among the elements of the original sentence may be established using a constituent model. A constituent may comprise a group of neighboring words in a sentence that behaves as a single entity. A constituent has a word at its core and may comprise child constituents at lower levels. A child constituent is a dependent constituent and may be associated with other constituents (such as parent constituents) for building the syntactic descriptions 202 of the original sentence.

Figure 9:
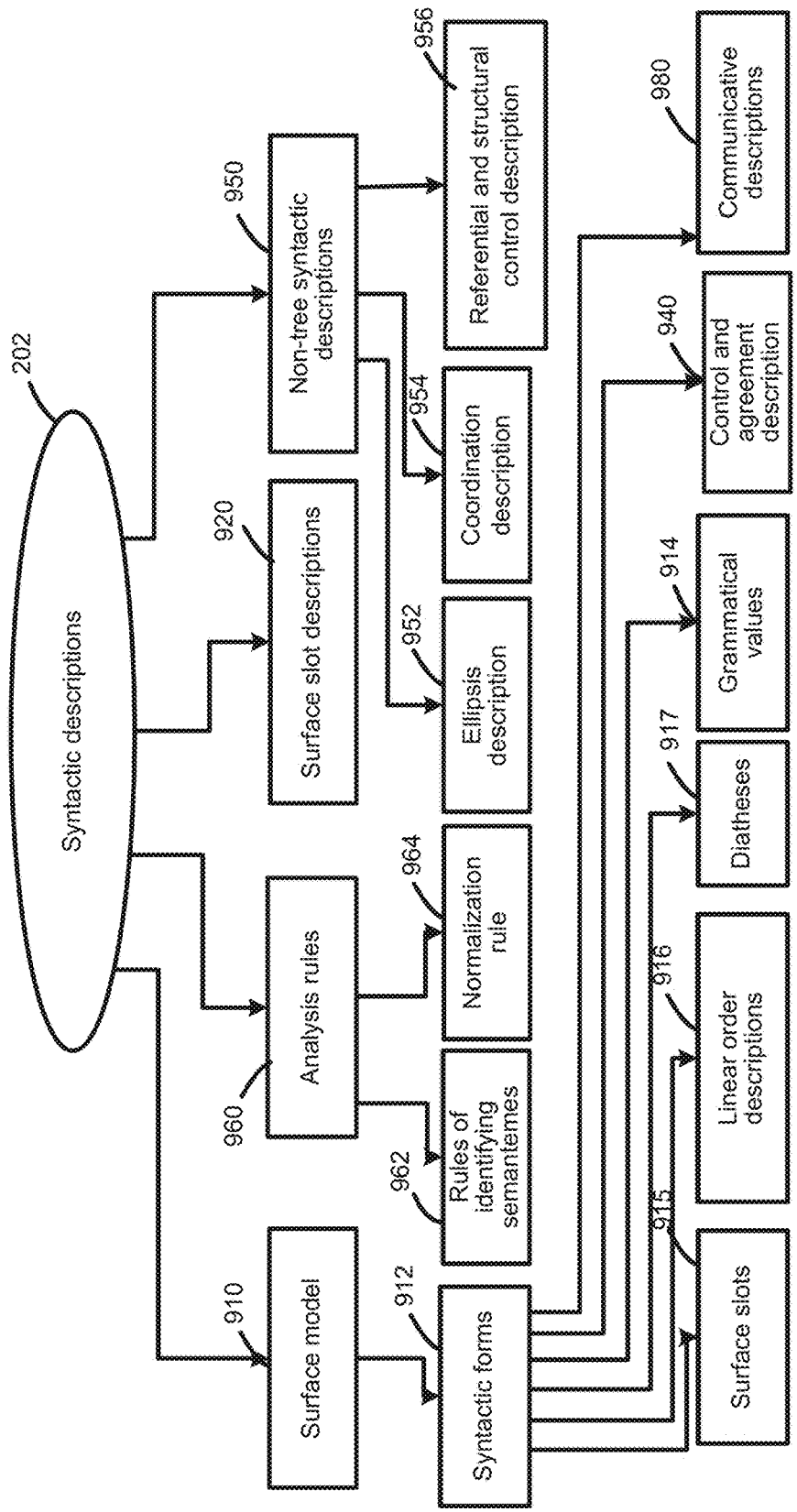
FIG. 9 schematically illustrates examples of syntactic descriptions, in accordance with one or more aspects of the present disclosure.

FIG. 9 illustrates exemplary syntactic descriptions. The components of the syntactic descriptions 202 may include, but are not limited to, surface models 910, surface slot descriptions 920, referential and structural control description 956, control and agreement description 940, non-tree syntactic description 950, and analysis rules 960. Syntactic descriptions 202 may be used to construct possible syntactic structures of the original sentence in a given natural language, taking into account free linear word order, non-tree syntactic phenomena (e.g., coordination, ellipsis, etc.), referential relationships, and other considerations.

Surface models 910 may be represented as aggregates of one or more syntactic forms ("syntforms" 912) employed to describe possible syntactic structures of the sentences that are comprised by syntactic description 102. In general, the lexical meaning of a natural language word may be linked to surface (syntactic) models 910. A surface model may represent constituents which are viable when the lexical meaning functions as the "core." A surface model may include a set of surface slots of the child elements, a description of the linear order, and/or diatheses. "Diathesis" herein shall refer to a certain relationship between an actor (subject) and one or more objects, having their syntactic roles defined by morphological and/or syntactic means. In an illustrative example, a diathesis may be represented by a voice of a verb: when the subject is the agent of the action, the verb is in the active voice, and when the subject is the target of the action, the verb is in the passive voice.

Figure 10:
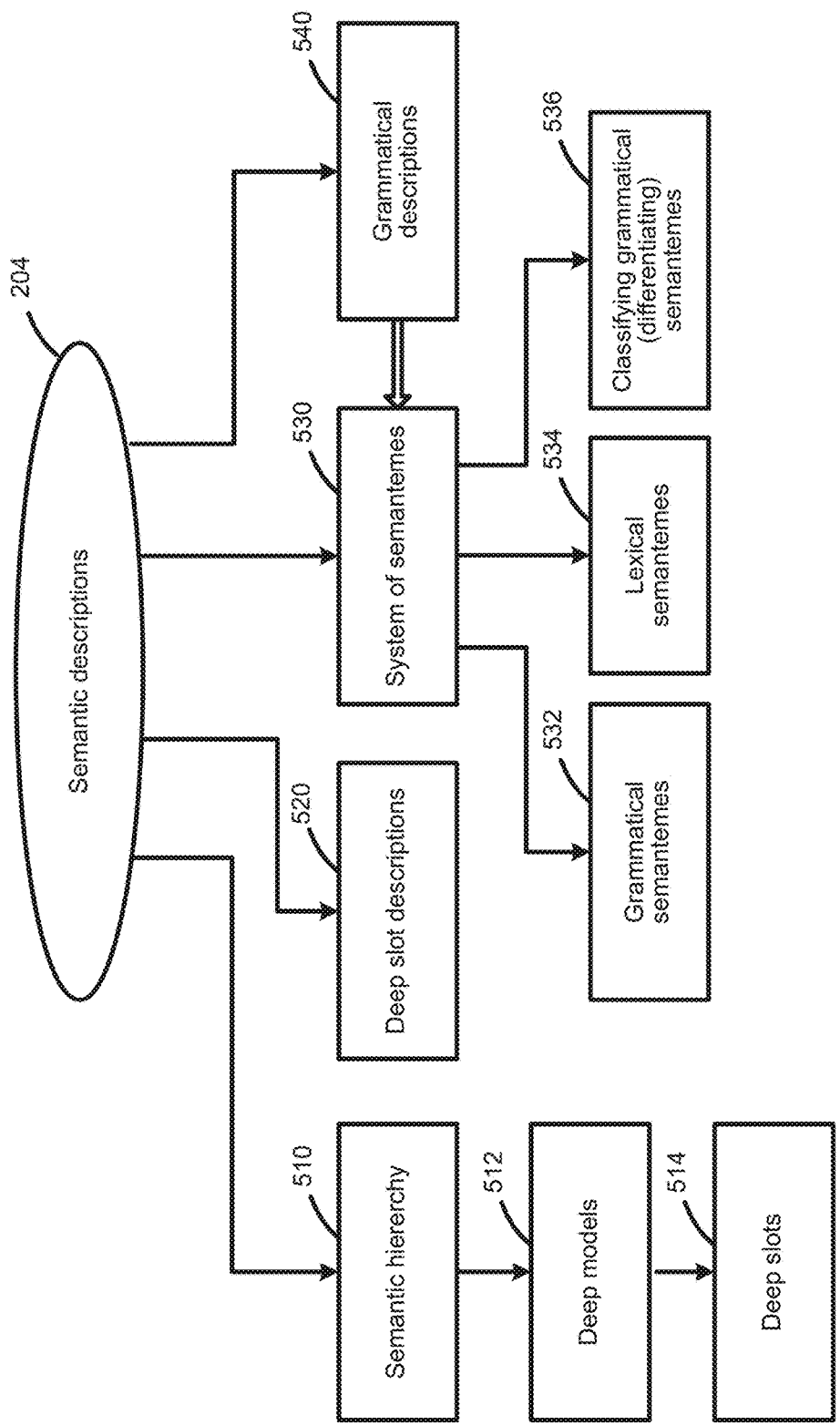
FIG. 10 schematically illustrates examples of semantic descriptions, in accordance with one or more aspects of the present disclosure.

A constituent model may utilize a plurality of surface slots 915 of the child constituents and their linear order descriptions 916 to describe grammatical values 914 of possible fillers of these surface slots. Diatheses 917 may represent relationships between surface slots 915 and deep slots 514 (as shown in FIG. 10). Communicative descriptions 980 describe communicative order in a sentence.

Linear order description 916 may be represented by linear order expressions reflecting the sequence in which various surface slots 915 may appear in the sentence. The linear order expressions may include names of variables, names of surface slots, parenthesis, grammemes, ratings, the "or" operator, etc. In an illustrative example, a linear order description of a simple sentence of "Boys play football" may be represented as "Subject Core Object_Direct," where Subject, Core, and Object_Direct are the names of surface slots 915 corresponding to the word order.

Communicative descriptions 980 may describe a word order in a syntform 912 from the point of view of communicative acts that are represented as communicative order expressions, which are similar to linear order expressions. The control and concord description 940 may comprise rules and restrictions which are associated with grammatical values of the related constituents and may be used in performing syntactic analysis.

Non-tree syntax descriptions 950 may be created to reflect various linguistic phenomena, such as ellipsis and coordination, and may be used in syntactic structures transformations which are generated at various stages of the analysis according to one or more aspects of the present disclosure. Non-tree syntax descriptions 950 may include ellipsis description 952, coordination description 954, as well as referential and structural control description 930, among others.

Analysis rules 960 may generally describe properties of a specific language and may be used in performing the semantic analysis. Analysis rules 960 may comprise rules of identifying semantemes 962 and normalization rules 964. Normalization rules 964 may be used for describing language-dependent transformations of semantic structures.

FIG. 10 illustrates exemplary semantic descriptions. Components of semantic descriptions 204 are language-independent and may include, but are not limited to, a semantic hierarchy 510, deep slots descriptions 520, a set of semantemes 530, and pragmatic descriptions 540.

The core of the semantic descriptions may be represented by semantic hierarchy 510 which may comprise semantic notions (semantic entities) which are also referred to as semantic classes. The latter may be arranged into hierarchical structure reflecting parent-child relationships. In general, a child semantic class may inherits one or more properties of its direct parent and other ancestor semantic classes. In an illustrative example, semantic class SUBSTANCE is a child of semantic class ENTITY and the parent of semantic classes GAS, LIQUID, METAL, WOOD_MATERIAL, etc.

Each semantic class in semantic hierarchy 510 may be associated with a corresponding deep model 512. Deep model 512 of a semantic class may comprise a plurality of deep slots 514 which may reflect semantic roles of child constituents in various sentences that include objects of the semantic class as the core of the parent constituent. Deep model 512 may further comprise possible semantic classes acting as fillers of the deep slots. Deep slots 514 may express semantic relationships, including, for example, "agent," "addressee," "instrument," "quantity," etc. A child semantic class may inherit and further expand the deep model of its direct parent semantic class.

Deep slots descriptions 520 reflect semantic roles of child constituents in deep models 512 and may be used to describe general properties of deep slots 514. Deep slots descriptions 520 may also comprise grammatical and semantic restrictions associated with the fillers of deep slots 514. Properties and restrictions associated with deep slots 514 and their possible fillers in various languages may be substantially similar and often identical. Thus, deep slots 514 are language-independent.

System of semantemes 530 may represents a plurality of semantic categories and semantemes which represent meanings of the semantic categories. In an illustrative example, a semantic category "DegreeOfComparison" may be used to describe the degree of comparison and may comprise the following semantemes: "Positive," "ComparativeHigherDegree," and "SuperlativeHighestDegree," among others. In another illustrative example, a semantic category "RelationToReferencePoint" may be used to describe an order (spatial or temporal in a broad sense of the words being analyzed), such as before or after a reference point, and may comprise the semantemes "Previous" and "Subsequent.". In yet another illustrative example, a semantic category "EvaluationObjective" can be used to describe an objective assessment, such as "Bad," "Good," etc.

System of semantemes 530 may include language-independent semantic attributes which may express not only semantic properties but also stylistic, pragmatic and communicative properties. Certain semantemes may be used to express an atomic meaning which corresponds to a regular grammatical and/or lexical expression in a natural language. By their intended purpose and usage, sets of semantemes may be categorized, e.g., as grammatical semantemes 532, lexical semantemes 534, and classifying grammatical (differentiating) semantemes 536.

Grammatical semantemes 532 may be used to describe grammatical properties of the constituents when transforming a syntactic tree into a semantic structure. Lexical semantemes 534 may describe specific properties of objects (e.g., "being flat" or "being liquid") and may be used in deep slot descriptions 520 as restriction associated with the deep slot fillers (e.g., for the verbs "face (with)" and "flood," respectively). Classifying grammatical (differentiating) semantemes 536 may express the differentiating properties of objects within a single semantic class. In an illustrative example, in the semantic class of HAIRDRESSER, the semanteme of <<RelatedToMen>> is associated with the lexical meaning of "barber," to differentiate from other lexical meanings which also belong to this class, such as "hairdresser," "hairstylist," etc. Using these language-independent semantic properties that may be expressed by elements of semantic description, including semantic classes, deep slots, and semantemes, may be employed for extracting the semantic information, in accordance with one or more aspects of the present invention.

Pragmatic descriptions 540 allow associating a certain theme, style or genre to texts and objects of semantic hierarchy 510 (e.g., "Economic Policy," "Foreign Policy," "Justice," "Legislation," "Trade," "Finance," etc.). Pragmatic properties may also be expressed by semantemes. In an illustrative example, the pragmatic context may be taken into consideration during the semantic analysis phase.

Figure 11:
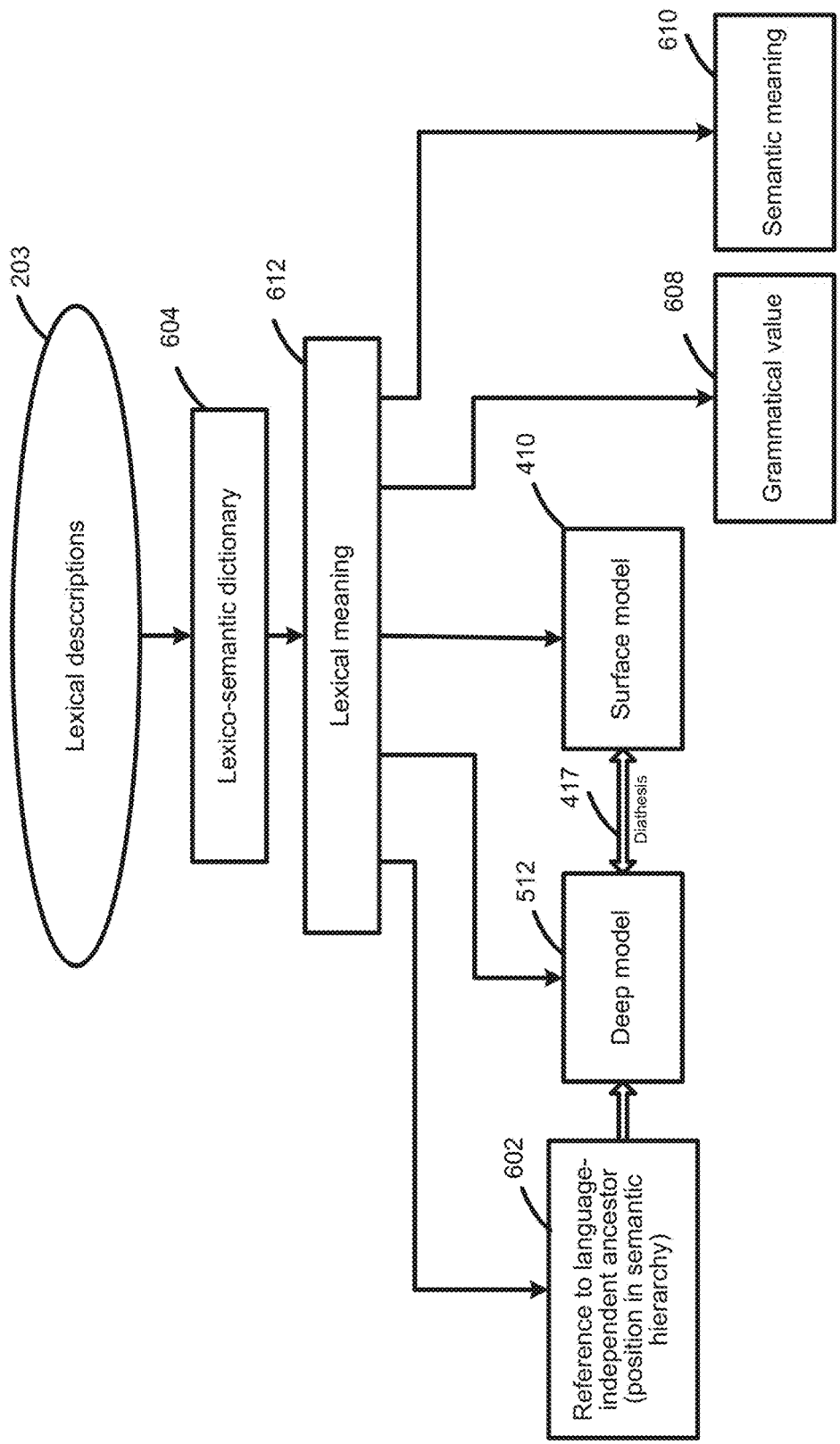
FIG. 11 schematically illustrates examples of lexical descriptions, in accordance with one or more aspects of the present disclosure.

FIG. 11 illustrates exemplary lexical descriptions. Lexical descriptions 203 represent a plurality of lexical meanings 612, in a certain natural language, for each component of a sentence. For a lexical meaning 612, a relationship 602 to its language-independent semantic parent may be established to indicate the location of a given lexical meaning in semantic hierarchy 510.

A lexical meaning 612 of lexical-semantic hierarchy 510 may be associated with a surface model 910 which, in turn, may be associated, by one or more diatheses 917, with a corresponding deep model 512. A lexical meaning 612 may inherit the semantic class of its parent, and may further specify its deep model 152.

A surface model 910 of a lexical meaning may comprise includes one or more syntforms 912. A syntform, 912 of a surface model 910 may comprise one or more surface slots 915, including their respective linear order descriptions 916, one or more grammatical values 914 expressed as a set of grammatical categories (grammemes), one or more semantic restrictions associated with surface slot fillers, and one or more of the diatheses 917. Semantic restrictions associated with a certain surface slot filler may be represented by one or more semantic classes, whose objects can fill the surface slot.

Figure 12:
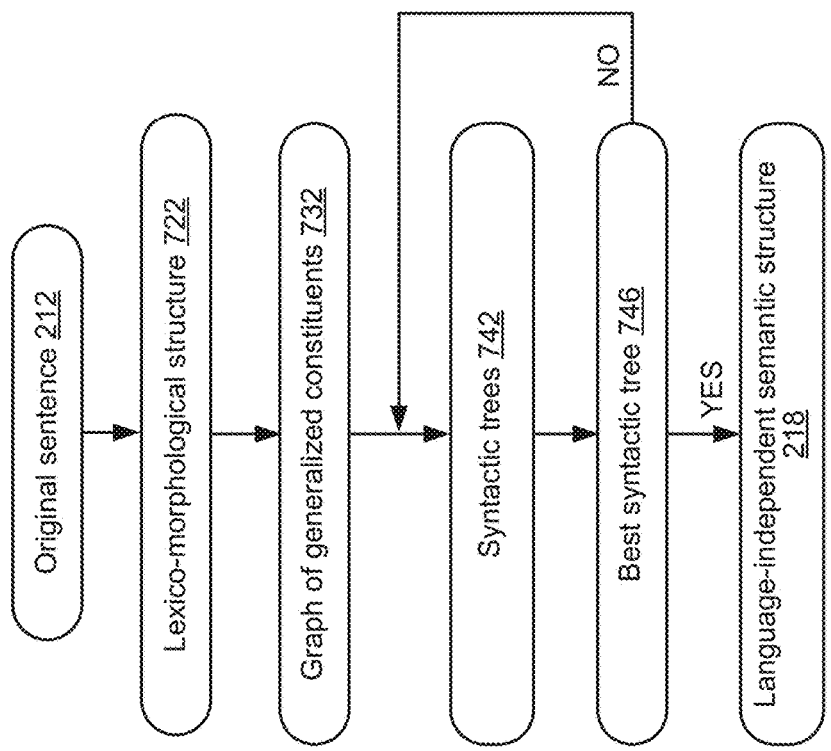
FIG. 12 schematically illustrates example data structures that may be employed by one or more methods implemented in accordance with one or more aspects of the present disclosure.

FIG. 12 schematically illustrates example data structures that may be employed by one or more methods described herein. Referring again to FIG. 5, at block 214, the computer system implementing the method may perform lexico-morphological analysis of sentence 212 to produce a lexico-morphological structure 722 of FIG. 12. Lexico-morphological structure 722 may comprise a plurality of mapping of a lexical meaning to a grammatical value for each lexical unit (e.g., word) of the original sentence. FIG. 6 schematically illustrates an example of a lexico-morphological structure.

At block 215, the computer system may perform a rough syntactic analysis of original sentence 212, in order to produce a graph of generalized constituents 732 of FIG. 12. Rough syntactic analysis involves applying one or more possible syntactic models of possible lexical meanings to each element of a plurality of elements of the lexico-morphological structure 722, in order to identify a plurality of potential syntactic relationships within original sentence 212, which are represented by graph of generalized constituents 732.

Graph of generalized constituents 732 may be represented by an acyclic graph comprising a plurality of nodes corresponding to the generalized constituents of original sentence 212, and further comprising a plurality of edges corresponding to the surface (syntactic) slots, which may express various types of relationship among the generalized lexical meanings. The method may apply a plurality of potentially viable syntactic models for each element of a plurality of elements of the lexico-morphological structure of original sentence 212 in order to produce a set of core constituents of original sentence 212. Then, the method may consider a plurality of viable syntactic models and syntactic structures of original sentence 212 in order to produce graph of generalized constituents 732 based on a set of constituents. Graph of generalized constituents 732 at the level of the surface model may reflect a plurality of viable relationships among the words of original sentence 212. As the number of viable syntactic structures may be relatively large, graph of generalized constituents 732 may generally comprise redundant information, including relatively large numbers of lexical meaning for certain nodes and/or surface slots for certain edges of the graph.

Graph of generalized constituents 732 may be initially built as a tree, starting with the terminal nodes (leaves) and moving towards the root, by adding child components to fill surface slots 915 of a plurality of parent constituents in order to reflect all lexical units of original sentence 212.

Figure 13:
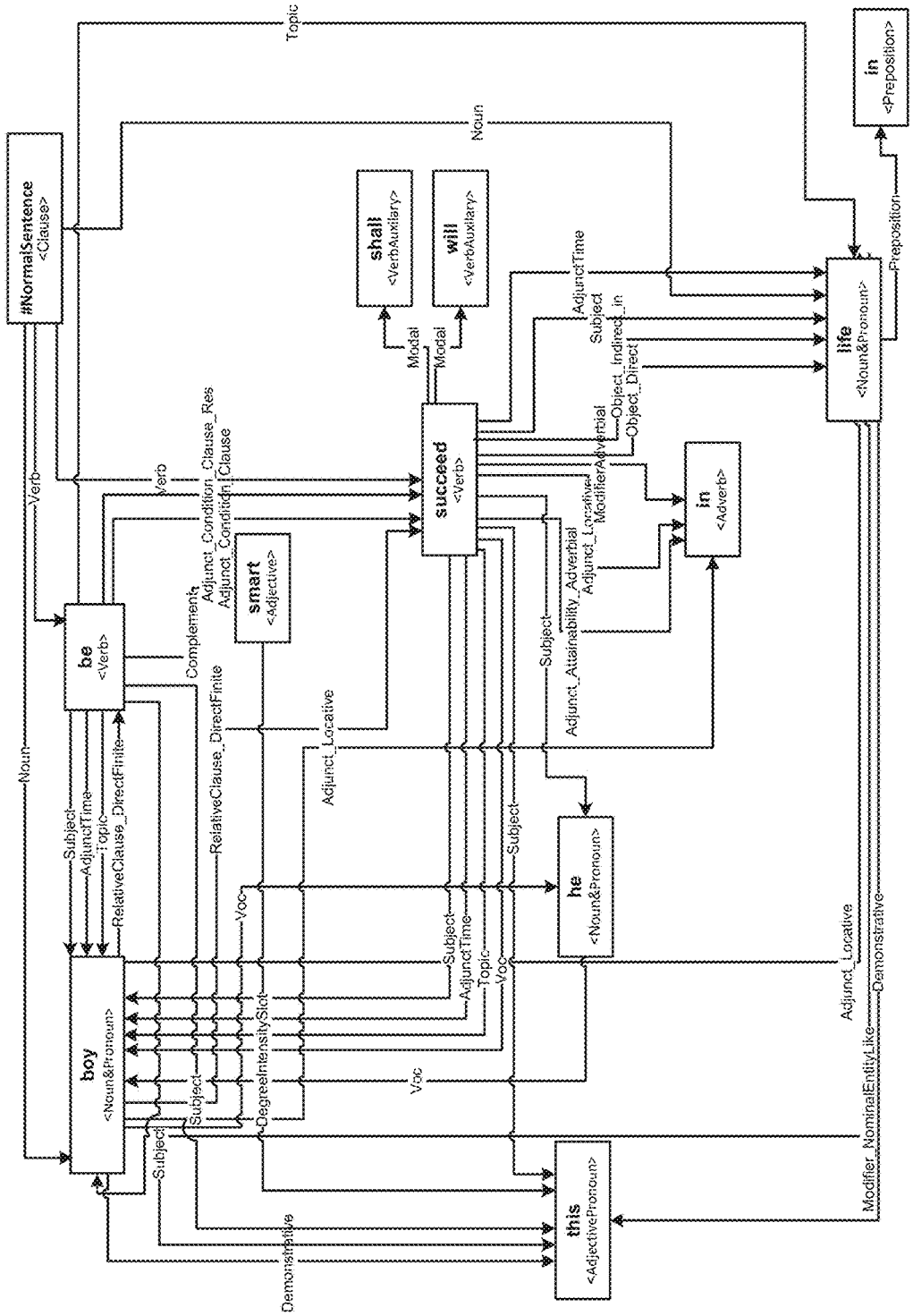
FIG. 13 schematically illustrates an example graph of generalized constituents, in accordance with one or more aspects of the present disclosure.

In certain implementations, the root of graph of generalized constituents 732 represents a predicate. In the course of the above described process, the tree may become a graph, as certain constituents of a lower level may be included into one or more constituents of an upper level. A plurality of constituents that represent certain elements of the lexico-morphological structure may then be generalized to produce generalized constituents. The constituents may be generalized based on their lexical meanings or grammatical values 914, e.g., based on part of speech designations and their relationships. FIG. 13 schematically illustrates an example graph of generalized constituents.

At block 216, the computer system may perform a precise syntactic analysis of sentence 212, to produce one or more syntactic trees 742 of FIG. 12 based on graph of generalized constituents 732. For each of one or more syntactic trees, the computer system may determine a general rating based on certain calculations and a priori estimates. The tree having the optimal rating may be selected for producing the best syntactic structure 746 of original sentence 212.

In the course of producing the syntactic structure 746 based on the selected syntactic tree, the computer system may establish one or more non-tree links (e.g., by producing redundant path among at least two nodes of the graph). If that process fails, the computer system may select a syntactic tree having a suboptimal rating closest to the optimal rating, and may attempt to establish one or more non-tree relationships within that tree. Finally, the precise syntactic analysis produces a syntactic structure 746 which represents the best syntactic structure corresponding to original sentence 212. In fact, selecting the best syntactic structure 746 also produces the best lexical values 240 of original sentence 212.

At block 217, the computer system may process the syntactic trees to the produce a semantic structure 218 corresponding to sentence 212. Semantic structure 218 may reflect, in language-independent terms, the semantics conveyed by original sentence. Semantic structure 218 may be represented by an acyclic graph (e.g., a tree complemented by at least one non-tree link, such as an edge producing a redundant path among at least two nodes of the graph). The original natural language words are represented by the nodes corresponding to language-independent semantic classes of semantic hierarchy 510. The edges of the graph represent deep (semantic) relationships between the nodes. Semantic structure 218 may be produced based on analysis rules 960, and may involve associating, one or more attributes (reflecting lexical, syntactic, and/or semantic properties of the words of original sentence 212) with each semantic class.

Figure 14:
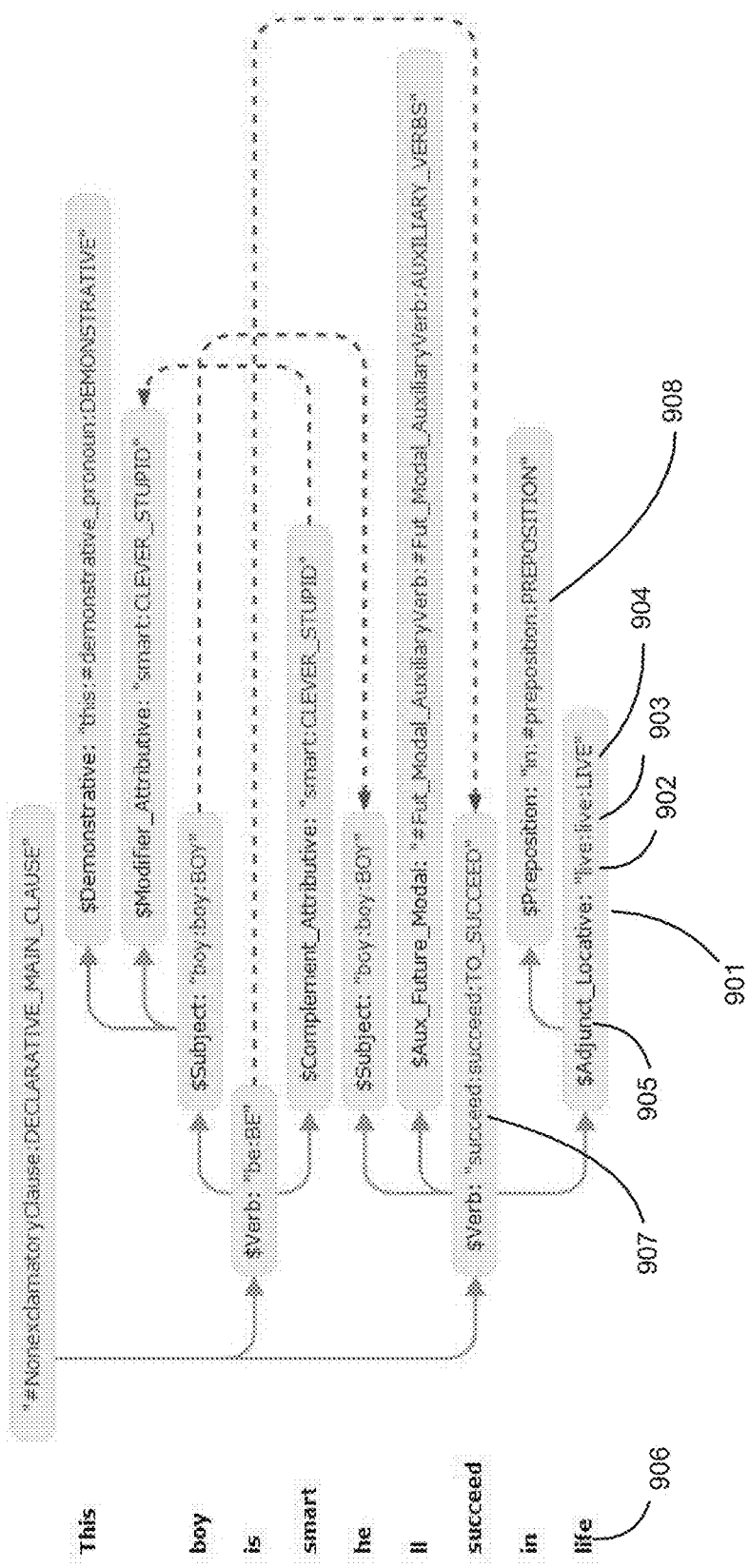
FIG. 14 illustrates an example syntactic structure corresponding to the sentence illustrated by FIG. 13.

FIG. 14 illustrates an example syntactic structure of a sentence derived from the graph of generalized constituents illustrated by FIG. 13. Node 901 corresponds to the lexical element "life" 906 in original sentence 212. By applying the method of syntactico-semantic analysis described herein, the computer system may establish that lexical element "life" 906 represents one of the lexemes of a derivative form "live" 902 associated with a semantic class "LIVE" 904, and fills in a surface slot $Adjunctr_Locative (905) of the parent constituent, which is represented by a controlling node $Verb:succeed:succeed:TO_SUCCEED (907).

Figure 15:
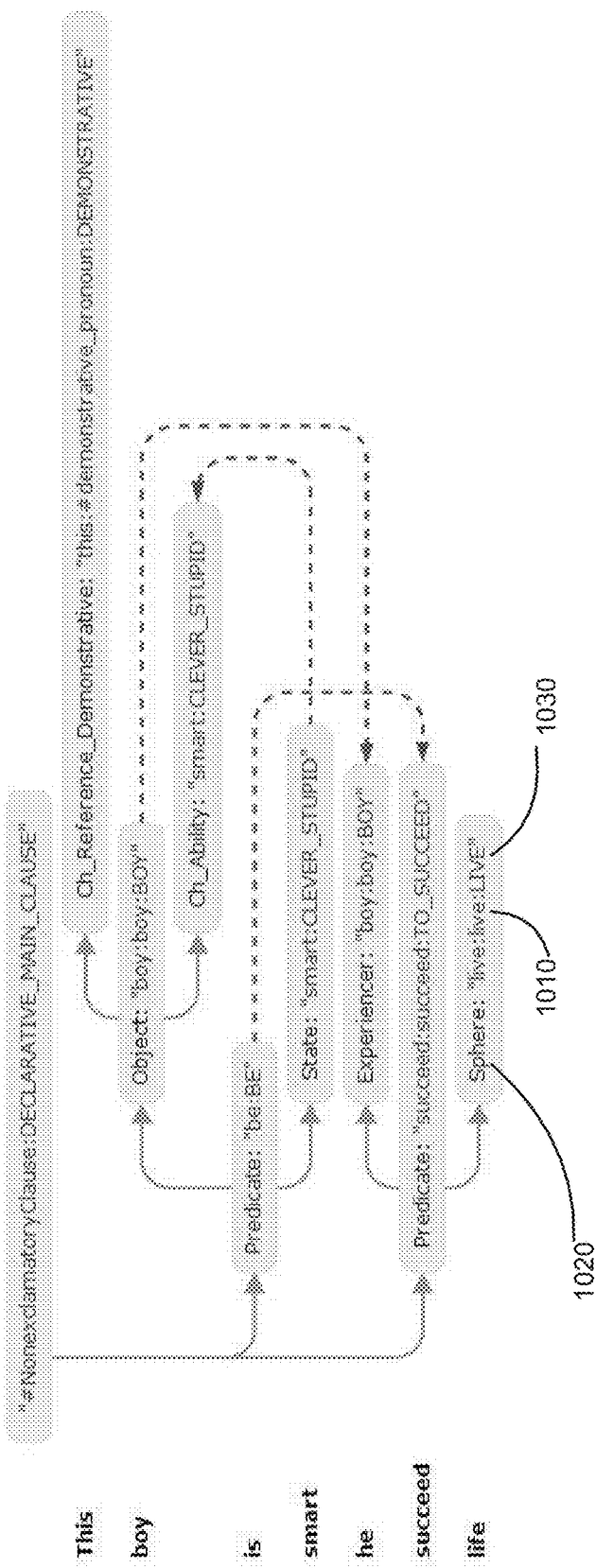
FIG. 15 illustrates a semantic structure corresponding to the syntactic structure of FIG. 14.

FIG. 15 illustrates a semantic structure corresponding to the syntactic structure of FIG. 14. With respect to the above referenced lexical element "life" 906 of FIG. 14, the semantic structure comprises lexical class 1010 and semantic classes 1030 similar to those of FIG. 14, but instead of surface slot 905, the semantic structure comprises a deep slot "Sphere" 1020.

As noted herein above, and ontology may be provided by a model representing objects pertaining to a certain branch of knowledge (subject area) and relationships among such objects. Thus, an ontology is different from a semantic hierarchy, despite the fact that it may be associated with elements of a semantic hierarchy by certain relationships (also referred to as "anchors"). An ontology may comprise definitions of a plurality of classes, such that each class corresponds to a concept of the subject area. Each class definition may comprise definitions of one or more objects associated with the class. Following the generally accepted terminology, an ontology class may also be referred to as concept, and an object belonging to a class may also be referred to as an instance of the concept.

In accordance with one or more aspects of the present disclosure, the computer system implementing the methods described herein may index one or more parameters yielded by the semantico-syntactic analysis. Thus, the methods described herein allow considering not only the plurality of words comprised by the original text corpus, but also pluralities of lexical meanings of those words, by storing and indexing all syntactic and semantic information produced in the course of syntactic and semantic analysis of each sentence of the original text corpus. Such information may further comprise the data produced in the course of intermediate stages of the analysis, the results of lexical selection, including the results produced in the course of resolving the ambiguities caused by homonymy and/or coinciding grammatical forms corresponding to different lexico-morphological meanings of certain words of the original language.

One or more indexes may be produced for each semantic structure. An index may be represented by a memory data structure, such as a table, comprising a plurality of entries. Each entry may represent a mapping of a certain semantic structure element (e.g., one or more words, a syntactic relationship, a morphological, lexical, syntactic or semantic property, or a syntactic or semantic structure) to one or more identifiers (or addresses) of occurrences of the semantic structure element within the original text.

In certain implementations, an index may comprise one or more values of morphological, syntactic, lexical, and/or semantic parameters. These values may be produced in the course of the two-stage semantic analysis, as described in more detail herein. The index may be employed in various natural language processing tasks, including the task of performing semantic search.

The computer system implementing the method may extract a wide spectrum of lexical, grammatical, syntactic, pragmatic, and/or semantic characteristics in the course of performing the syntactico-semantic analysis and producing semantic structures. In an illustrative example, the system may extract and store certain lexical information, associations of certain lexical units with semantic classes, information regarding grammatical forms and linear order, information regarding syntactic relationships and surface slots, information regarding the usage of certain forms, aspects, tonality (e.g., positive and negative), deep slots, non-tree links, semantemes, etc.

The computer system implementing the methods described herein may produce, by performing one or more text analysis methods described herein, and index any one or more parameters of the language descriptions, including lexical meanings, semantic classes, grammemes, semantemes, etc. Semantic class indexing may be employed in various natural language processing tasks, including semantic search, classification, clustering, text filtering, etc. Indexing lexical meanings (rather than indexing words) allows searching not only words and forms of words, but also lexical meanings, i.e., words having certain lexical meanings. The computer system implementing the methods described herein may also store and index the syntactic and semantic structures produced by one or more text analysis methods described herein, for employing those structures and/or indexes in semantic search, classification, clustering, and document filtering.

Figure 16:
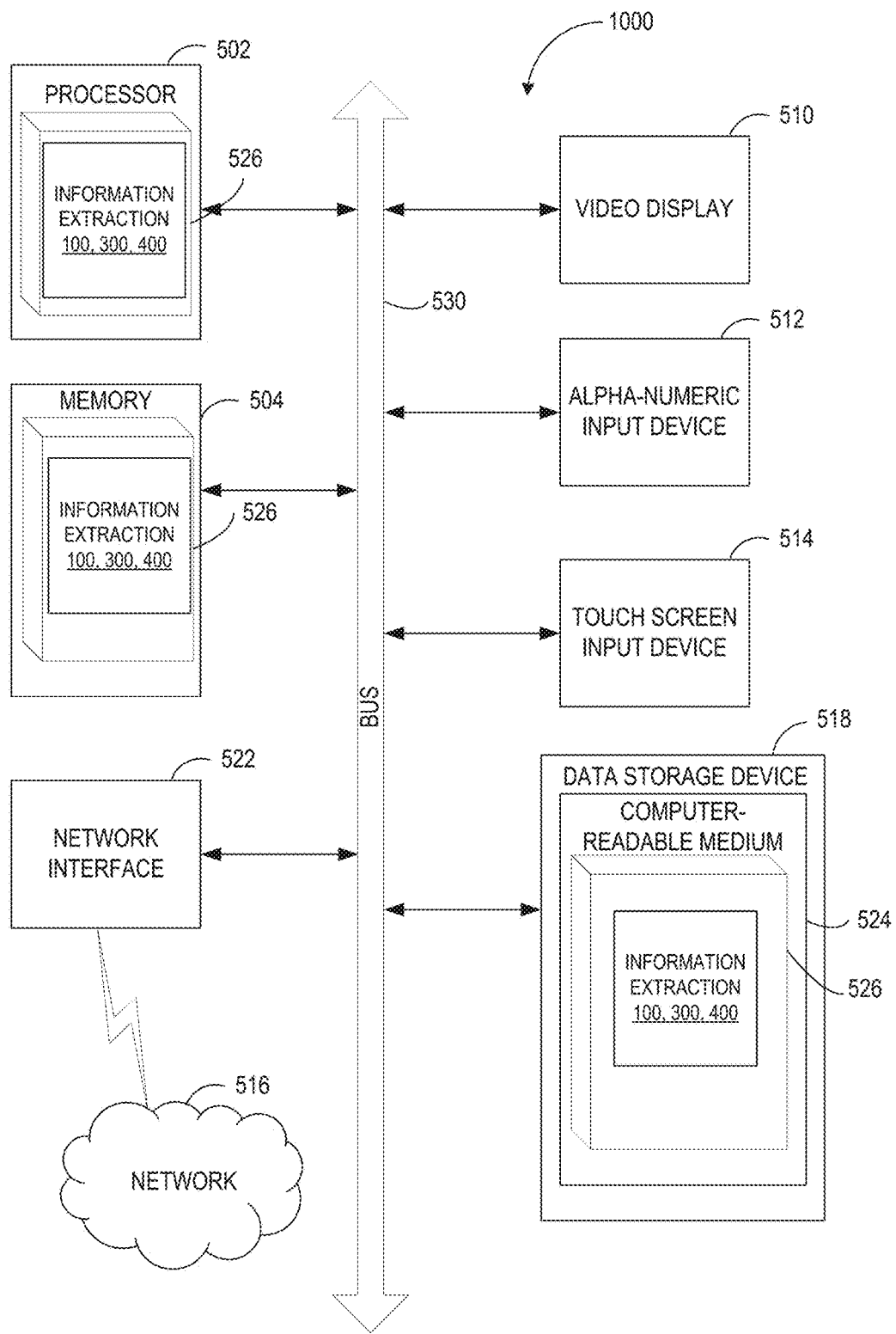
FIG. 16 depicts a diagram of an example computer system implementing the methods described herein.

FIG. 16 illustrates a diagram of an example computer system 1000 which may execute a set of instructions for causing the computer system to perform any one or more of the methods discussed herein. The computer system may be connected to other computer system in a LAN, an intranet, an extranet, or the Internet. The computer system may operate in the capacity of a server or a client computer system in client-server network environment, or as a peer computer system in a peer-to-peer (or distributed) network environment. The computer system may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 1000 includes a processor 502, a main memory 504 (e.g., read-only memory (ROM) or dynamic random access memory (DRAM)), and a data storage device 518, which communicate with each other via a bus 530.

Processor 502 may be represented by one or more general-purpose computer systems such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose computer systems such as an application specific integrated circuit (ASIC), a field programmable gate array (FPGA), a digital signal processor (DSP), network processor, or the like. Processor 502 is configured to execute instructions 526 for performing the operations and functions discussed herein.

Computer system 1000 may further include a network interface device 522, a video display unit 510, a character input device 512 (e.g., a keyboard), and a touch screen input device 514.

Data storage device 518 may include a computer-readable storage medium 524 on which is stored one or more sets of instructions 526 embodying any one or more of the methodologies or functions described herein. Instructions 526 may also reside, completely or at least partially, within main memory 504 and/or within processor 502 during execution thereof by computer system 1000, main memory 504 and processor 502 also constituting computer-readable storage media. Instructions 526 may further be transmitted or received over network 516 via network interface device 522.

In certain implementations, instructions 526 may include instructions of methods 100, 300 and/or 400 for information extraction and classifier training, in accordance with one or more aspects of the present disclosure. While computer-readable storage medium 524 is shown in the example of FIG. 16 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "computing," "calculating," "obtaining," "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
    extracting, by a computer system, a first plurality of information objects from a natural language text by applying, to a plurality of attributes of the natural language text, a machine learning classifier yielding a degree of association of a fragment of the natural language text with a pre-defined class of information objects;
    extracting, from the natural language text, a second plurality of information objects;
    identifying a set of conflicting information objects, such that a first information object of the set of conflicting information objects belongs to the first plurality of information objects and a second information object of the set of conflicting information objects belongs to the second plurality of information objects; and
    producing a final list of information objects extracted from the natural language text, by applying, to the set of conflicting information objects, a conflict arbitration function which performs at least one of: modifying the first information object, deleting the first information object, or merging two or more information objects of the set of conflicting information objects.

2. The method of claim 1, wherein extracting the first plurality of information objects is performed by a first information extraction technique and extracting the second plurality of information objects is performed by a second information extraction technique.

3. The method of claim 1, further comprising:
    utilizing the final list of information objects for performing a natural language processing operation.

4. The method of claim 1, further comprising:
    representing the final list of information objects by a Resource Definition Framework (RDF) graph.

5. The method of claim 1, wherein identifying the set of conflicting information objects further comprises:
    determining that a first textual annotation associated with the first information object is overlapping with a second textual annotation associated with the second information object.

6. The method of claim 1, wherein identifying the set of conflicting information objects further comprises:
    evaluating a logical condition comprising a first attribute of the first information object and a second attribute of the second information object.

7. The method of claim 1, wherein identifying the set of conflicting information objects further comprises:
    identifying an information object having a number of attributes of a certain type exceeding a threshold number of attributes of the certain type.

8. The method of claim 1, wherein performing the conflict arbitration function further comprises:
    applying a set of production rules to a second plurality of attributes of the natural language text.

9. The method of claim 1, wherein performing the conflict arbitration function further comprises:
    applying, to a second plurality of attributes of the natural language text, a second machine learning classifier yielding at least one of: a likelihood of the first information object and the second information object representing a same object, a level of confidence of the first information object, or a level of confidence of the second information object.

10. The method of claim 9, further comprising:
    accepting a user input validating the final list of information objects;
    appending, to a training data set, the natural language text accompanied by metadata comprising definitions and textual annotations of one or more information objects of the final list of information objects;
    training, utilizing the training data set, the second machine learning classifier implementing the conflict arbitration function.

11. The method of claim 9, wherein the second plurality of attributes of the natural language text comprises one or more confidence levels associated with respective information objects.

12. The method of claim 1, further comprising:
    accepting a user input validating the first plurality of information objects to produce a training data set;
    appending, to a training data set, the natural language text accompanied by metadata comprising definitions and textual annotations of one or more information objects of the first plurality of information objects;
    training, utilizing the training data set, the machine learning classifier utilized for information extraction.

13. A computer system, comprising:
    a memory;
    a processor, coupled to the memory, the processor configured to:
        extract, from a natural language text, a first plurality of information objects;
        extract, from the natural language text, a second plurality of information objects;

identify a set of conflicting information objects, such that a first information object of the set of conflicting information objects belongs to the first plurality of information objects and a second information object of the set of conflicting information objects belongs to the second plurality of information objects; and produce a final list of information objects extracted from the natural language text, by applying, to the set of conflicting information objects, a conflict arbitration function which performs at least one of: modifying the first information object, deleting the first information object, or merging two or more information objects of the set of conflicting information objects, wherein the conflict arbitration function implements a machine learning classifier yielding at least one of: a likelihood of the first information object and the second information object representing a same object, a level of confidence of the first information object, or a level of confidence of the second information object.

14. The computer system of claim 13, wherein extracting the first plurality of information objects is performed by a first information extraction technique and extracting the second plurality of information objects is performed by a second information extraction technique.

15. The computer system of claim 13, further comprising:
utilizing the final list of information objects for performing a natural language processing operation.

16. A computer-readable non-transitory storage medium comprising executable instructions that, when executed by a computer system, cause the computer system to:

extract, from a natural language text, a first plurality of information objects by applying, to a plurality of attributes of the natural language text, a machine learning classifier yielding a degree of association of a fragment of the natural language text with a pre-defined class of information objects;

extract, from the natural language text, a second plurality of information objects;

identify a set of conflicting information objects, such that a first information object of the set of conflicting information objects belongs to the first plurality of information objects and a second information object of the set of conflicting information objects belongs to the second plurality of information objects; and produce a final list of information objects extracted from the natural language text, by applying, to the set of conflicting information objects, a conflict arbitration function which performs at least one of: modifying the first information object, deleting the first information object, or merging two or more information objects of the set of conflicting information objects.

17. The computer-readable non-transitory storage medium of claim 16, wherein extracting the first plurality of information objects is performed by a first information extraction technique and extracting the second plurality of information objects is performed by a second information extraction technique.

18. The computer-readable non-transitory storage medium of claim 16, further comprising:
utilizing the final list of information objects for performing a natural language processing operation.

* * * * *